(12) United States Patent
Ito

(10) Patent No.: US 9,401,168 B1
(45) Date of Patent: Jul. 26, 2016

(54) CONTROL DEVICE FOR ACCESSING A STORAGE MEDIUM

(71) Applicant: MARVELL INTERNATIONAL LTD., Hamilton (BM)

(72) Inventor: Kiyotada Ito, Hiratsuka (JP)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/593,537

(22) Filed: Jan. 9, 2015

Related U.S. Application Data

(60) Provisional application No. 61/925,577, filed on Jan. 9, 2014, provisional application No. 61/925,573, filed on Jan. 9, 2014.

(51) Int. Cl.
*G11B 5/596* (2006.01)
*G11B 20/10* (2006.01)

(52) U.S. Cl.
CPC ........ *G11B 5/59694* (2013.01); *G11B 5/59605* (2013.01); *G11B 20/10037* (2013.01)

(58) Field of Classification Search
None
See application file for complete search history.

(56) References Cited

U.S. PATENT DOCUMENTS

| 5,325,247 | A | 6/1994 | Ehrlich et al. | |
|---|---|---|---|---|
| 5,329,409 | A * | 7/1994 | Hampshire | G11B 21/083 360/77.02 |
| 5,426,545 | A | 6/1995 | Sidman et al. | |
| 6,262,619 | B1 * | 7/2001 | McGreer | H03F 3/45973 327/307 |
| 6,496,319 | B1 * | 12/2002 | Kusumoto | G11B 5/54 360/75 |
| 6,693,400 | B2 * | 2/2004 | Pedrazzini | H02P 25/028 318/567 |
| 6,757,129 | B2 * | 6/2004 | Kuroiwa | G11B 5/5526 360/77.02 |
| 6,975,479 | B2 * | 12/2005 | Kokami | G11B 5/5547 360/77.02 |
| 7,046,465 | B1 | 5/2006 | Kupferman | |
| 7,280,308 | B2 * | 10/2007 | Kokami | G05B 11/28 360/77.02 |
| 7,710,678 | B2 * | 5/2010 | Kokami | G11B 5/5526 360/75 |
| 7,848,044 | B2 * | 12/2010 | Kokami | G11B 5/5526 360/75 |
| 8,295,002 | B1 | 10/2012 | Katchmart | |
| 8,963,455 | B2 * | 2/2015 | Kurosawa | H02P 25/028 318/135 |
| 8,982,497 | B2 * | 3/2015 | Sugie | H02P 25/028 360/67 |
| 2002/0033687 | A1 * | 3/2002 | Abe | G11B 5/5526 360/75 |
| 2002/0071199 | A1 * | 6/2002 | Kokami | G11B 5/596 360/77.02 |
| 2002/0176202 | A1 * | 11/2002 | Yoshida | G11B 21/12 360/75 |
| 2004/0027088 | A1 * | 2/2004 | Abe | G11B 21/02 318/650 |
| 2005/0168862 | A1 * | 8/2005 | Jeong | G11B 5/5534 360/75 |
| 2007/0001632 | A1 * | 1/2007 | Daio | G11B 5/5526 318/400.04 |
| 2007/0195451 | A1 * | 8/2007 | Kokami | G05B 11/28 360/78.04 |
| 2008/0007271 | A1 * | 1/2008 | Smith | G11B 5/5526 324/601 |
| 2014/0340785 | A1 * | 11/2014 | Miura | G11B 5/48 360/75 |
| 2014/0340789 | A1 * | 11/2014 | Miura | H02P 25/028 360/99.08 |

* cited by examiner

*Primary Examiner* — Wayne Young
*Assistant Examiner* — James L Habermehl

(57) ABSTRACT

A disk apparatus control device including an A/D converting section that samples an analog current amount signal indicating a current amount for a drive current of a motor that moves a head for accessing a storage disk of a disk apparatus, and converts the analog current amount signal into a digital current amount signal indicating the current amount. The device can further include a control signal generating section that, according to digital control, generates a digital control signal corresponding to a manipulation amount of the drive current, based on a difference between the current amount indicated by the digital current amount signal and a target value for the current amount of the drive current. Additionally, the device can include a D/A converting section that converts the digital control signal into an analog control signal, and outputs the analog control signal to a drive current generating section that generates the drive current.

15 Claims, 24 Drawing Sheets

CONTROL DEVICE FOR ACCESSING A STORAGE MEDIUM

INCORPORATION BY REFERENCE

The present disclosure claims the benefit of U.S. Provisional Applications No. 61/925,573, "HDD HEAD POSITIONING SYSTEM FOR HIGHER MULTI-RATE CONTROL", and No. 61/925,577, "DIGITAL VCM CURRENT CONTROL" both filed on Jan. 9, 2014, which are incorporated herein by reference in their entirety.

BACKGROUND

The present invention relates to a control device, a disk apparatus, a method, and a storage medium. Generally, disk drives include a microprocessor, a voice coil (VCM) analog driver, and a VCM actuator (driver actuator). Further, disk drives may include a servo control that uses a multirate notch filter. To perform feedback control with an analog drive circuit that drives a control target such as an actuator, a driver IC requires many external components, such as capacitors and resistors connected to a comparator for comparing the detected value of the control amount for a drive current to a target value. Furthermore, the driver IC can require many pins in order to connect the many external components.

In order to perform multirate control, an amount of control data transferred to the driver IC per unit time is increased. Furthermore, when the number of conditional variables or control targets for the drive circuit increases, the amount of data transferred to the driver IC per unit time increases. For example, in a disk apparatus, in addition to a motor for driving the head assembly and a motor for driving the storage disk, there is also control performed for a piezo element that moves the head and control performed to restrict the effect of vibration of the disk apparatus. As a result, an amount of control data that must be transferred to the driver IC per unit time is increased.

SUMMARY

According to a first aspect of the disclosure, provided is a control device including an AD converting section that samples an analog current amount signal indicating a current amount for a drive current of a motor that moves a head for accessing a storage disk of a disk apparatus, and converts the analog current amount signal into a digital current amount signal indicating the current amount. The control device can further include a control signal generating section that, according to digital control, generates a digital control signal corresponding to a manipulation amount of the drive current, based on a difference between the current amount indicated by the digital current amount signal and a target value for the current amount of the drive current, and a DA converting section that converts the digital control signal into an analog control signal, and outputs the analog control signal to a drive current generating section that generates the drive current.

The AD converting section, the control signal generating section, and the DA converting section may be implemented in one control circuit, along with a target value generating section that generates a target value signal indicating the target value of the current amount based on a detection value for a position of the head.

The control circuit may be provided separately from a drive circuit in which the drive current generating section is implemented.

The analog control signal may be transmitted to the drive circuit through a first analog signal line that is connected between the control circuit and the drive circuit, and the analog current amount signal may be transmitted to the control circuit through a second analog signal line that is connected between the control circuit and the drive circuit.

The drive current generating section may be implemented in the control circuit.

The AD converting section, the control signal generating section, and the DA converting section may be implemented in one drive circuit, along with the drive current generating section, and the drive circuit may be provided separately from a control circuit in which is implemented a target value generating section that generates a target value signal indicating a target value for the current amount based on a detection value of a position of the head.

The AD converting section, the control signal generating section, and the DA converting section may be implemented in one drive circuit, along with the drive current generating section, the drive circuit may be provided separately from a control circuit in which is implemented a prescribed period signal generating section that, based on a detection value for a position of the head sampled with a prescribed period, generates a control signal relating to the current amount with the prescribed period, and the control device may further comprise a multirate processing section that is implemented in the drive circuit and, based on the control signal generated with the prescribed period by the prescribed period signal generating section, generates a target value for the current amount with a period shorter than the prescribed period and outputs the generated target value to the control signal generating section.

A second aspect of the disclosure provides a disk apparatus that can include the control device described above.

Another aspect of the disclosure provides a method including sampling an analog current amount signal indicating a current amount for a drive current of a motor that moves a head for accessing a storage disk of a disk apparatus, and converting the analog current amount signal into a digital current amount signal indicating the current amount. Further, according to digital control, the method can include generating a digital control signal corresponding to a manipulation amount of the drive current, based on a difference between the current amount indicated by the digital current amount signal and a target value for the current amount of the drive current, and converting the digital control signal into an analog control signal, and outputting the analog control signal to a drive current generating section that generates the drive current.

The converting the analog current amount signal into a digital current amount signal, the generating the digital control signal, and the converting the digital control signal into an analog control signal may be performed by a control circuit in which is implemented a function to generate a target value signal indicating the target value of the current amount based on a detection value for a position of the head.

The control circuit may be provided separately from a drive circuit in which the drive current generating section is implemented.

The analog control signal may be transmitted to the drive circuit through a first analog signal line that is connected between the control circuit and the drive circuit, and the analog current amount signal may be transmitted to the control circuit through a second analog signal line that is connected between the control circuit and the drive circuit.

The drive current generating section may be implemented in the control circuit.

The converting the analog current amount signal into a digital current amount signal, the generating the digital control signal, and the converting the digital control signal into an analog control signal may be performed by a drive circuit in which is implemented the drive current generating section, and the drive circuit may be provided separately from a control circuit in which is implemented a target value generating section that generates a target value signal indicating a target value for the current amount based on a detection value of a position of the head.

The converting the analog current amount signal into a digital current amount signal, the generating the digital control signal, and the converting the digital control signal into an analog control signal may be performed by a drive circuit in that is implemented the drive current generating section. The method may further include, in a control circuit provided separately from the drive circuit, based on a detection value for a position of the head sampled with a prescribed period, generating a control signal relating to the current amount with the prescribed period, and in the drive circuit, based on the control signal generated with the prescribed period by the control circuit, generating a target value for the current amount with a period shorter than the prescribed period. Generating the digital control signal may include, in the drive circuit, according to digital control, generating a digital control signal corresponding to a manipulation amount of the drive current, based on a difference between the current amount indicated by the digital current amount signal and the target value for the current amount of the drive current generated with the period shorter than the prescribed period.

Another aspect of the disclosure may provide a storage medium storing including instructions that, when read by a processor, cause the processor to perform each part of the method described above.

Of course, it should be understood that the summary does not necessarily describe all necessary features of the embodiments of the invention. The invention may also be a sub-combination of the features described above.

BRIEF DESCRIPTION OF THE DRAWINGS

Various embodiments of this disclosure that are proposed as examples will be described in detail with reference to the following figures, wherein like numerals reference like elements, and wherein.

DESCRIPTION OF EXEMPLARY EMBODIMENTS

Figure 1:
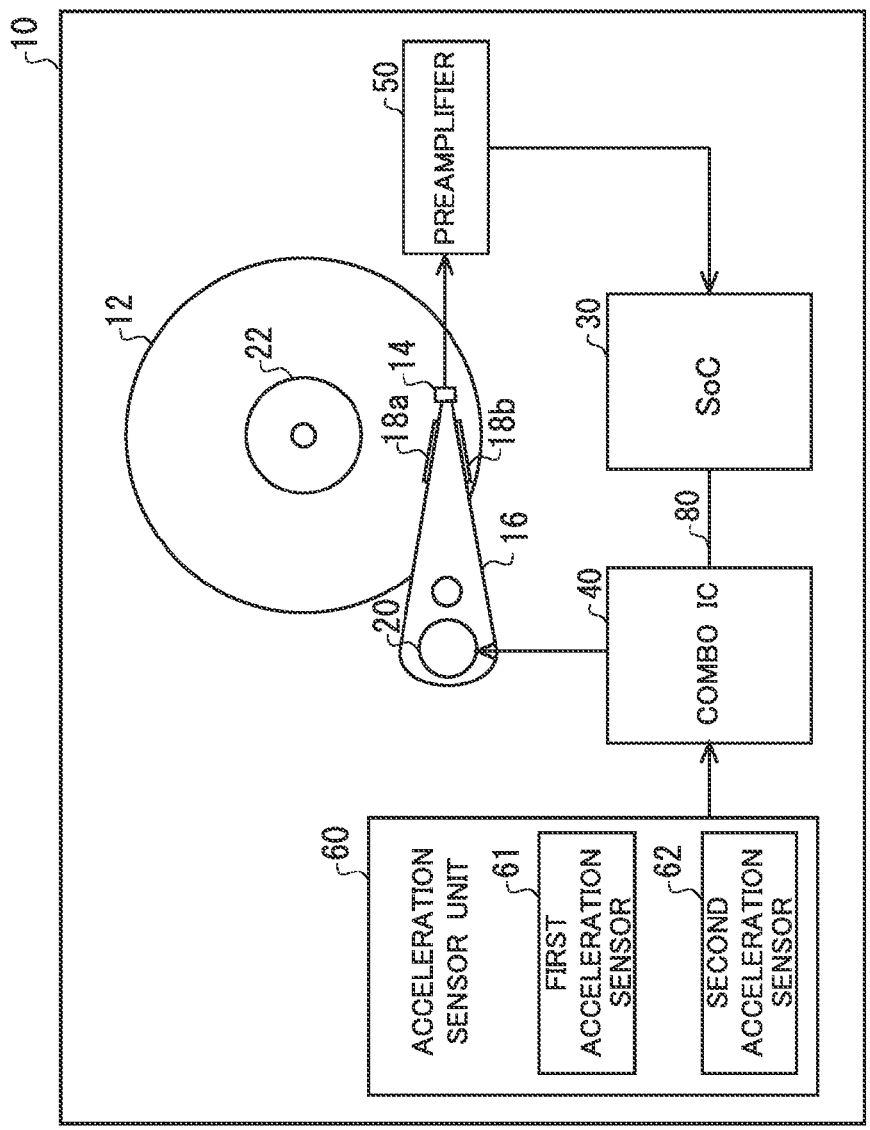
FIG. 1 shows an exemplary block diagram of a hard disk apparatus 10 according to an embodiment of the invention.

FIG. 1 shows an exemplary block diagram of a hard disk apparatus 10 according to an embodiment. As shown, the hard disk apparatus 10 can include a disk 12, a head 11, an arm 16, a piezo actuator 18a, a piezo actuator 18b, a VCM 20, a spindle motor 22, a SoC 30, a combo IC 40, a pre-amplifier 50, an acceleration sensor unit 60, and a SIF 80. The acceleration sensor unit 60 can further include a first acceleration sensor 61 and a second acceleration sensor 62. In the description of the present embodiment, the piezo actuator 18a and the piezo actuator 18b are referred to collectively as the piezo actuator 18. The SIF 80 is a serial interface. The CPU 200 and the SoC 30 exchange signals with each other through the SIF 80.

The disk 12 is an example of a disk-shaped storage medium. The disk 12 can stores data magnetically on a surface portion. Servo information may be recorded on the disk 12 with a data surface servo format. For example, disk 12 includes tracks with each track further including a plurality of data regions in which data can be written and a plurality of servo regions in which servo information is written. The servo regions are provided at prescribed intervals in each track. Burst information, which is an example of servo information, is written in the servo regions.

The VCM 20 is an example of a voice coil motor. The VCM 20 includes a coil portion and a permanent magnet. With a current being supplied to the coil portion of the VCM 20, the VCM 20 generates drive force (rotational force) to rotate the arm 16 and rotates the arm 16 around a prescribed axis.

The arm 16 supports the head 14. The arm 16 rotates on a prescribed axis, within a plane that is substantially parallel to the recording surface of the disk. Due to the rotation of the arm 16, the head 14 moves in a plane substantially parallel to the recording surface of the disk. In this way, the head 14 is moved by the VCM 20.

The head 14 accesses the disk 12. Specifically, the head 14 magnetically writes data on the disk 12. Furthermore, the head 14 magnetically reads data that is written on the disk 12.

The pre-amplifier 50 amplifies the information read from the disk 12 by the head 14, and outputs a read signal to the SoC 30. The SoC 30 calculates the current position of the head 14 on the surface of the disk 12, based on the read signal of servo information read from the servo regions.

The SoC 30 acquires a data read address or a data write address, based on control commands received from a host computer. The SoC 30 calculates a target position of the head 14, based on the read address or data write address. The SoC 30 determines a target value for the current amount supplied to the VCM 20, based on the current position of the head 14 and the target position of the head 14, and outputs a target value signal indicating this target value to the combo IC 40.

The combo IC 40 generates a drive current, which is the current supplied to the VCM 20, based on the target value signal acquired from the SoC 30. The combo IC 40 performs feedback control of the drive current, such that a current amount corresponding to the target value signal acquired from the SoC 30 is supplied to the VCM 20. In this way, under the control of the SoC 30 and the combo IC 40, the VCM 20 is supplied with a current corresponding to the current position and the target position of the head 14, thereby causing the head 14 to move to the target position on the surface of the disk 12 or to be withdrawn from the surface.

The first acceleration sensor 61 detects a first acceleration that is within a plane parallel to the plane in which the arm 16 moves. The second acceleration sensor 62 detects a second acceleration that is within a plane parallel to the plane in which the arm 16 moves. For example, the first acceleration sensor 61 and the second acceleration sensor 62 are provided at different positions within the hard disk apparatus 10, and detect acceleration in substantially the same direction. The combo IC 40 acquires an acceleration amount detected by the first acceleration sensor 61 and an acceleration amount calculated by the second acceleration sensor 62, and calculates a detection value for angular acceleration. The combo IC 40 converts the angular acceleration detection value into a digital signal, and outputs this digital signal to the SoC 30. The SoC 30 calculates a correction value for the drive current of the VCM 20, based on the angular acceleration detection value acquired from the combo IC 40, and outputs the correction value to the combo IC 40. The combo IC 40 corrects the drive current of the VCM 20 based on the correction value acquired from the SoC 30.

Furthermore, the SoC 30 determines a target value for voltage to be applied to the piezo actuator 18, based on the target position and the current position of the head 14, and outputs a target value signal indicating this target value to the combo IC 40. The combo IC 40 controls the voltage applied to the piezo actuator 18, based on the target value signal for the applied voltage acquired from the SoC 30. By displacing the piezo actuator 18 according to the applied voltage, the position of the head 14 is changed.

The combo IC 40 outputs current supplied for each phase of the spindle motor 22. The combo IC 40 detects the center tap voltage of the spindle motor 22, and outputs a detection value of the center tap voltage to the SoC 30. The SoC 30 calculates the current rotational speed of the spindle motor 22, based on the center tap voltage detection value acquired from the combo IC 40. The SoC 30 determines the target value of the current supplied for each phase of the spindle motor 22, based on the current rotational speed and a rotational speed target value of the spindle motor 22, and outputs a target value signal indicating this target value to the combo IC 40. The combo IC 40 supplies the current for each phase of the spindle motor 22, based on the target value signal for the current of the spindle motor 22 acquired from the SoC 30.

The SoC 30 acquires data recorded on the disk 12, based on the data read signal acquired from the data regions of the disk 12. The SoC 30 transfers the acquired data to the host computer. Furthermore, the SoC 30 encodes data transmitted from the host computer, generates a write signal to be written to the disk 12, and outputs the write signal to the head 14.

Figure 2:
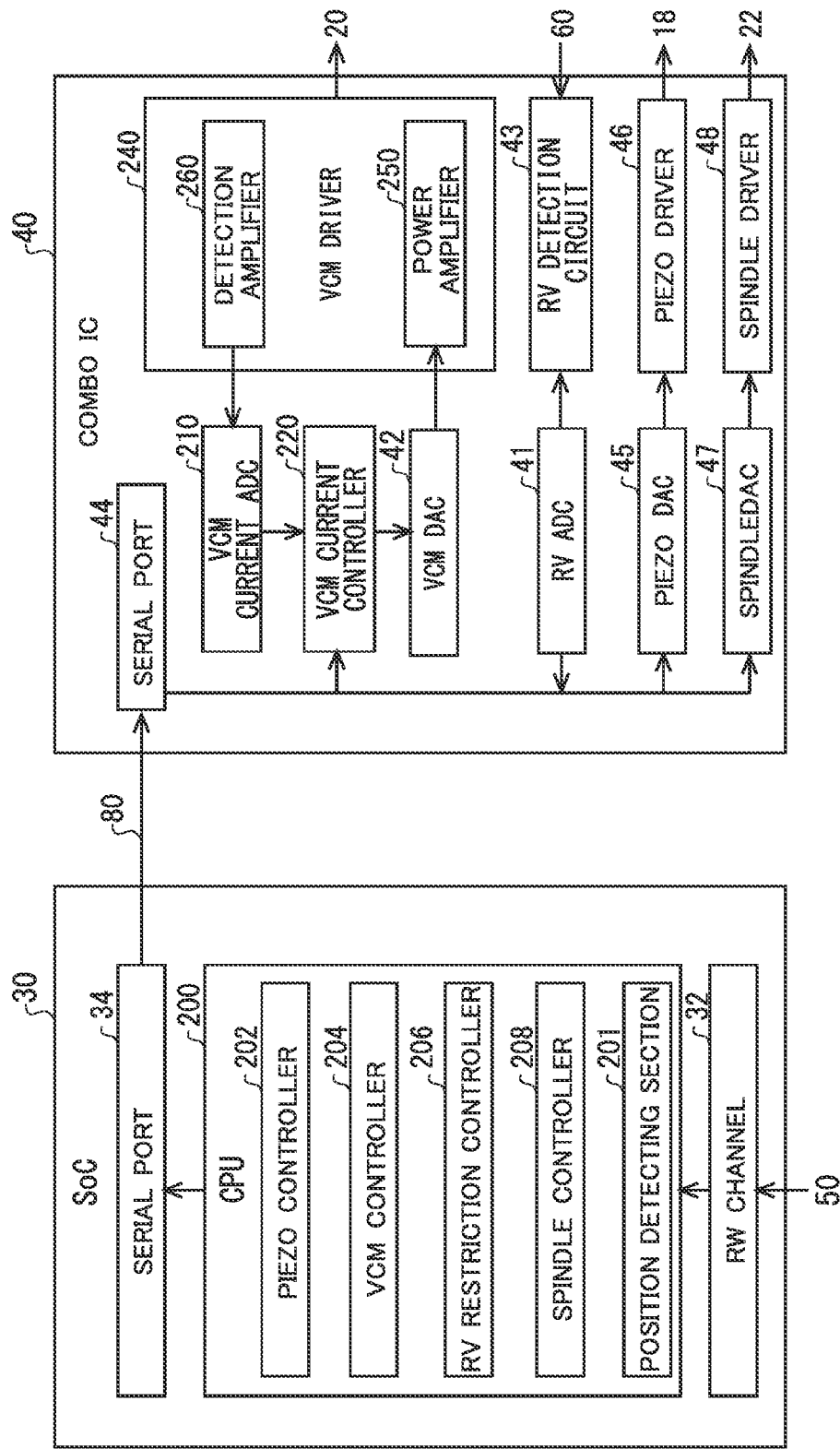
FIG. 2 shows an exemplary block configuration of the SoC 30 and the combo IC 40.

FIG. 2 shows an exemplary block configuration of the SoC 30 and the combo IC 40. The SoC 30 includes an RW channel 32, a CPU 200, and a serial port 34. The combo IC 40 includes an RV ADC 41, a VCM DAC 42, an RV detection circuit 43, a serial port 44, a piezo DAC 45, a piezo driver 46, a spindle DAC 47, a spindle driver 48, a VCM current controller 220, a VCM current ADC 210, and a VCM driver 240.

The CPU 200 can further include a position calculating section 201, a piezo controller 202, a VCM controller 204, an RV restriction controller 206, and a spindle controller 208. The CPU 200 and the SoC 30 exchange signals with each other through the SIF 80 between the serial port 34 and the serial port 44.

The VCM driver 240 of the combo IC 40 is an example of a drive current generating section that generates the drive current for the VCM 20. The VCM driver 240 includes a power amplifier 250 and a detection amplifier 260. The power amplifier 250 generates the drive current for the VCM 20 according to a voltage input to the VCM driver 240. The detection amplifier 260 amplifies the voltage corresponding to the drive current of the VCM 20, to generate a detection value for the drive current of the VCM 20.

The RV detection circuit 43 detects the angular acceleration within a plane parallel to the plane in which the arm 16 moves, based on an acceleration amount in a first direction and an acceleration amount in a second direction detected by the acceleration sensor unit 60, and outputs this angular acceleration to the RV ADC 41. The RV ADC 41 converts the angular acceleration detection value into a digital signal, and outputs this digital signal to the serial port 44. The CPU 200 acquires the angular acceleration detection value through serial communication from the combo IC 40.

In the SoC 30, the RW channel 32 outputs the data information to the CPU 200, based on the data read signal output from the pre-amplifier 50. The CPU 200 extracts the data stored in the disk 12, by decoding the data information. The CPU 200 generates write data by encoding data to be transferred from the host computer, and outputs this write data to the RW channel 32. The RW channel 32 generates a write signal based on the write data, and outputs this write signal to the head 14.

Furthermore, the RW channel 32 outputs the servo information to the CPU 200, based on a servo information read signal output from the pre-amplifier 50. The position calculating section 201 calculates the current position of the head 14 on the surface of the disk 12, based on the servo information.

The piezo controller 202 determines a target value for the application voltage applied to the piezo actuator 18, based on the target position of the head 14 and the current position calculated by the position calculating section 201. The CPU 200 causes a digital signal indicating the target value for the application voltage determined by the piezo controller 202 to be output from the serial port 34.

The VCM controller 204 determines the target value for the drive current of the VCM 20, based on the target position of the head 14 and the current position calculated by the position calculating section 201. The CPU 200 causes a digital signal indicating the target value for the drive current determined by the VCM controller 204 to be output from the serial port 34.

The RV restriction controller 206 determines a correction value for the drive current of the VCM 20, based on the angular acceleration detection value acquired from the combo IC 40 through serial communication. The CPU 200 causes a digital signal indicating the correction value for the drive current determined by the VCM controller 204 to be output from the serial port 34. In this way, the RV restriction controller 206 performs control to restrict the effect that external vibration experienced by the hard disk apparatus 10 has on the positioning of the head 14 at the target position.

The spindle controller 208 determines a target value for the drive current of the spindle motor 22, based on the center tap voltage of the spindle motor 22 detected by the combo IC 40. The CPU 200 causes a digital signal indicating the target value for the drive current determined by the spindle controller 208 to be output from the serial port 34.

The serial port 34 outputs digital signals respectively indicating the target value for the drive current of the VCM 20, the correction value for the drive current of the VCM 20, the target value for the application voltage of the piezo actuator 18, and the target value for the drive current of the spindle motor 22 to the combo IC 40 as serial data.

The serial port 44 acquires the digital signals respectively indicating the target value for the drive current of the VCM 20, the correction value for the drive current of the VCM 20, the target value for the application voltage of the piezo actuator 18, and the target value for the drive current of the spindle motor 22 output from the serial port 34.

The digital signal indicating the target value for the application voltage of the piezo actuator 18 acquired by the serial port 44 is output to the piezo DAC 45. The piezo DAC 45 performs a DA conversion on the digital signal indicating the target value for the application voltage acquired from the serial port 44, and outputs a voltage corresponding to the target value to the piezo driver 46. The piezo driver 46 applies, to the piezo actuator 18, a voltage corresponding to the voltage output from the piezo DAC 45.

The digital signal indicating the target value for the current of the VCM 20 acquired by the serial port 44 is output to the VCM current controller 220. The digital signal indicating the correction value for the current of the VCM 20 acquired by the serial port 44 is output to the VCM current controller 220.

The drive current detection value generated by the detection amplifier 260 of the VCM driver 240 is converted into a digital signal by the VCM current ADC 210. The drive current detection value that has been converted into a digital signal by the VCM current ADC 210 is output to the VCM current controller 220. The VCM current ADC 210 is an example of an AD converting section that samples the analog current amount signal indicating the drive current amount of the VCM 20 and converts this signal into a digital current amount signal indicating the current amount.

The VCM current controller 220 is an example of a control signal generating section that, using digital control, generates a digital control signal corresponding to a manipulation amount of the drive current, based on the difference between the current amount indicated by the digital current amount signal and the target value for the current amount of the drive current. Specifically, the VCM current controller 220 uses digital control to output a digital signal indicating the drive current amount of the VCM 20 to the VCM DAC 42, based on the digital signal indicating the target value acquired from the serial port 44 and the digital signal indicating the drive current detection value acquired from the VCM current ADC 210.

The VCM DAC 42 is an example of a DA converting section that converts the digital control signal into an analog control signal, and outputs this analog control signal to the VCM driver 240. Specifically, the VCM DAC 42 converts the digital signal output from the VCM current controller 220 into an analog signal, and outputs an analog voltage signal corresponding to the target value for the drive current to the VCM driver 240. The power amplifier 250 of the VCM driver 240 generates a drive current corresponding to the voltage output from the VCM DAC 42, and supplies this drive current to the VCM 20.

The digital signal indicating the target value for the current of each phase of the spindle motor 22 acquired by the serial port 44 is output to the spindle DAC 47. The spindle DAC 47 converts the digital signal indicating the target value for the current of each phase from the serial port 44 into an analog signal, and outputs an analog voltage signal corresponding to the target value to the spindle driver 48. The spindle driver 48 supplies the current corresponding to the voltage output from the spindle DAC 47 for each phase of the spindle motor 22. In this way, the rotational speed of the spindle motor 22 is controlled to be a prescribed rotational speed, and the disk 12 is rotated at a prescribed rotational speed.

The head 14 reads the servo information recorded in the tracks, while the disk 12 is rotating at the prescribed rotational speed. In this way, the servo information is read by the head 14 with a substantially prescribed period and output from the RW channel 32 to the CPU 200. As a result, the detection signal for the position of the head 14 is sampled with a substantially prescribed period.

The piezo controller 202, the VCM controller 204, and the RV restriction controller 206 generate a target value signal with a period that is shorter than the period of the head 14 position detection signal, according to multirate control. Specifically, the position detection signal generated by the position calculating section 201 is converted into a position signal with a period that is shorter than the position detection period, by an interpolator. The piezo controller 202, the VCM controller 204, and the RV restriction controller 206 generate the respective target values based on the position signal with the short period resulting from the conversion by the interpolator.

In the present embodiment, the multirate order of the piezo controller 202 may be four. The multirate order of the VCM controller 204 may be two. The multirate order of the RV restriction controller 206 may be two.

As described above, the VCM current ADC 210, the VCM current controller 220, and the VCM DAC 42 are provided together with the VCM driver 240 in one combo IC 40. The combo IC 40 is provided separately from the SoC 30 on which the VCM controller 204 is implemented. The VCM controller 204 is an example of a target value generating section that generates a target value signal indicating the target value for the drive current amount, based on the head 14 position detection value. The SoC 30 is an example of a control circuit in which this target value generating section is implemented.

Figure 3:
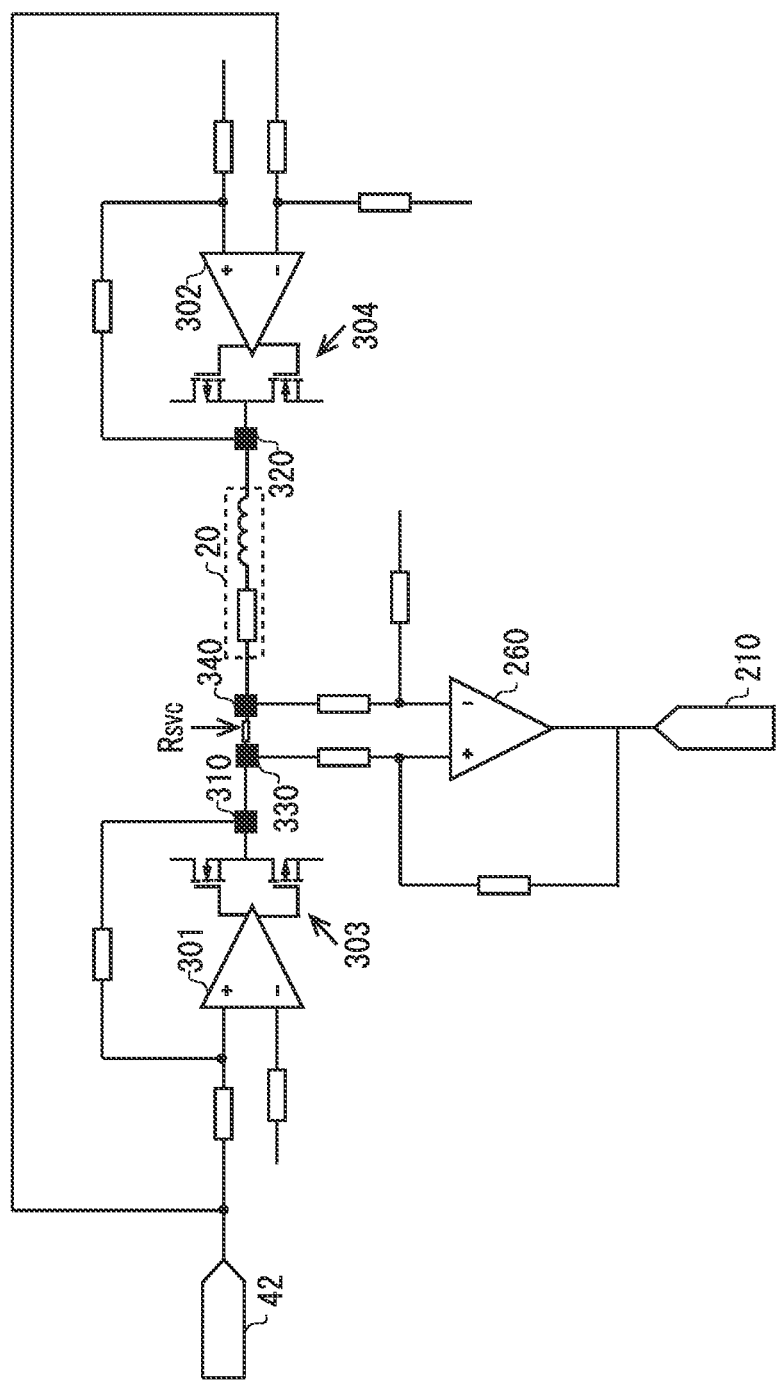
FIG. 3 is a schematic view of a circuit configuration relating to driving of the VCM 20 and detection of the drive current.

FIG. 3 is a schematic view of an exemplary circuit configuration relating to driving of the VCM 20 and detection of the drive current. FIG. 3 shows the VCM DAC 42, the VCM current ADC 210, the circuit configuration of the VCM driver 240, external pins and external devices related to these components, and the VCM 20.

The amplification amplifier 301 and the amplification amplifier 302 form the power amplifier 250. The combo IC 40 includes an $A_{OUT}$ pin 310 and a $B_{OUT}$ pin 320 for output of the drive current and a VSNSP pin 330 and a VSNSN pin 340 for current detection, as external pins relating to the driving of the VCM 20.

In the combo IC 40, the output of the VCM DAC 42 is input to both the amplification amplifier 301 and the amplification amplifier 302. The amplification amplifier 301 drives the H-bridge circuit 303 according to a comparison between the input voltage and a reference voltage. The amplification amplifier 302 drives the H-bridge circuit 304 according to a comparison between the input voltage and a reference voltage.

In the combo IC 40, the current output section of the H-bridge circuit 303 is electrically connected to the $A_{OUT}$ pin 310. The current output section of the H-bridge circuit 304 is electrically connected to the $B_{OUT}$ pin 320.

Outside the combo IC 40, one end of the coil portion of the VCM 20 is electrically connected to the $B_{OUT}$ pin 320. The other end of the coil portion of the VCM 20 is electrically connected to the VSNSN pin 340. The VSNSP pin 330 is electrically connected to the $A_{OUT}$ pin 310.

Outside the combo IC 40, one end of the resistance $R_{SVC}$ for current detection is electrically connected to the VSNSN pin 340. The other end of the resistance $R_{SVC}$ is electrically connected to the VSNSP pin 330. By connecting the resistance $R_{SVC}$ outside the combo IC 40, a resistor with a suitable resistance value can be selectively used as the resistance $R_{SVC}$.

In the combo IC 40, the VSNSP pin 330 and the VSNSN pin 340 are electrically connected to two input sections of the detection amplifier 260. The output of the detection amplifier 260 is electrically connected to the VCM current ADC 210.

Figure 4:
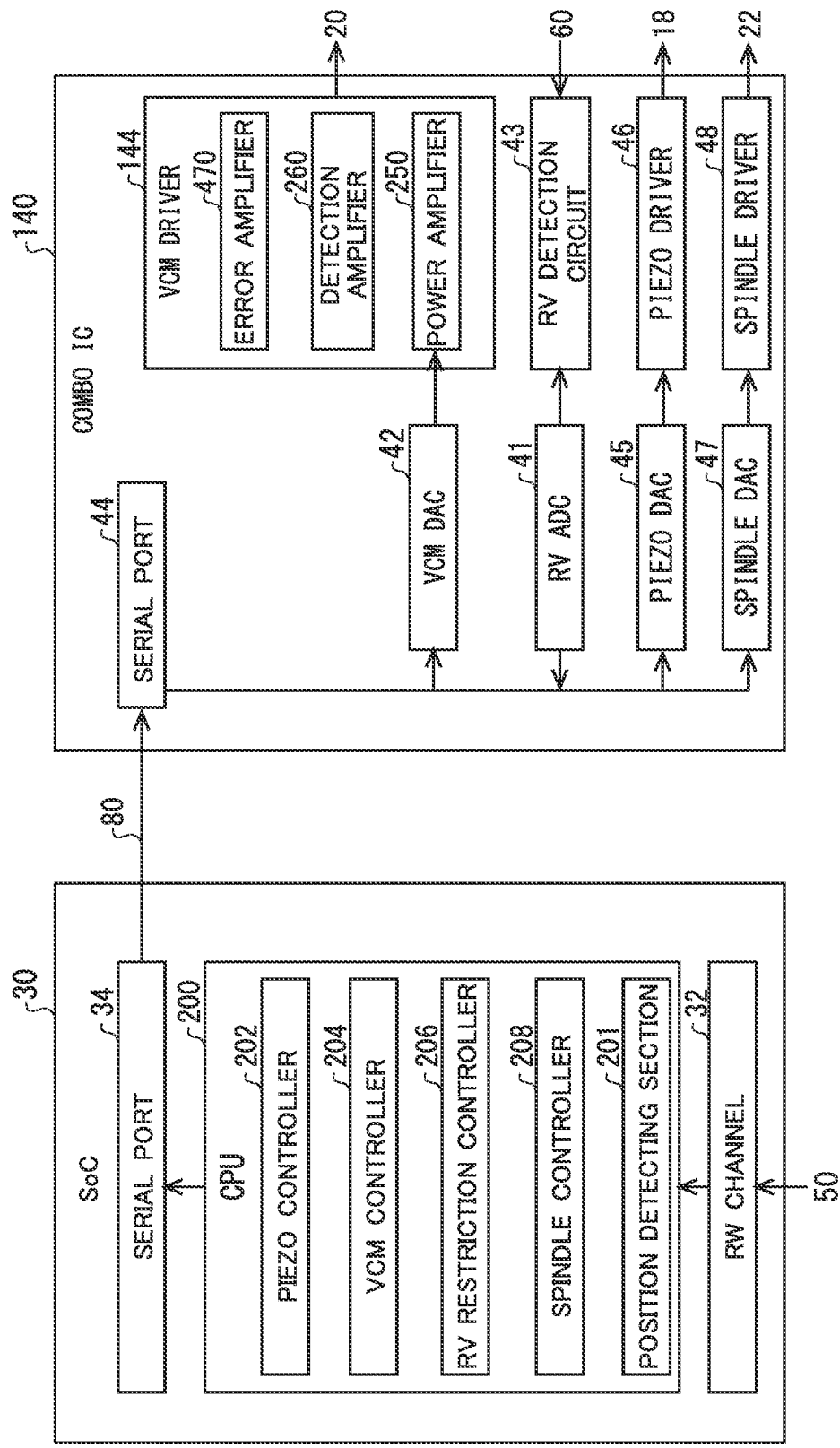
FIG. 4 is an exemplary block diagram showing a combo IC 140 as a comparative example.

FIG. 4 is a block diagram showing a combo IC 140 as a comparative example. The combo IC 140 includes an RV ADC 41, a VCM DAC 42, an RV detection circuit 43, a serial port 44, piezo DAC 45, piezo driver 46, a spindle DAC 47, a spindle driver 48, and a VCM driver 144. The VCM DAC 42 receives digital signal that indicates the target value for the drive current and that is transferred from the VCM controller 204 through the serial port 44.

The VCM driver 144 includes a power amplifier 250, a detection amplifier 260, and an error amplifier 470. The error amplifier 470 performs analog feedback control on the drive current of the VCM 20.

Figure 5:
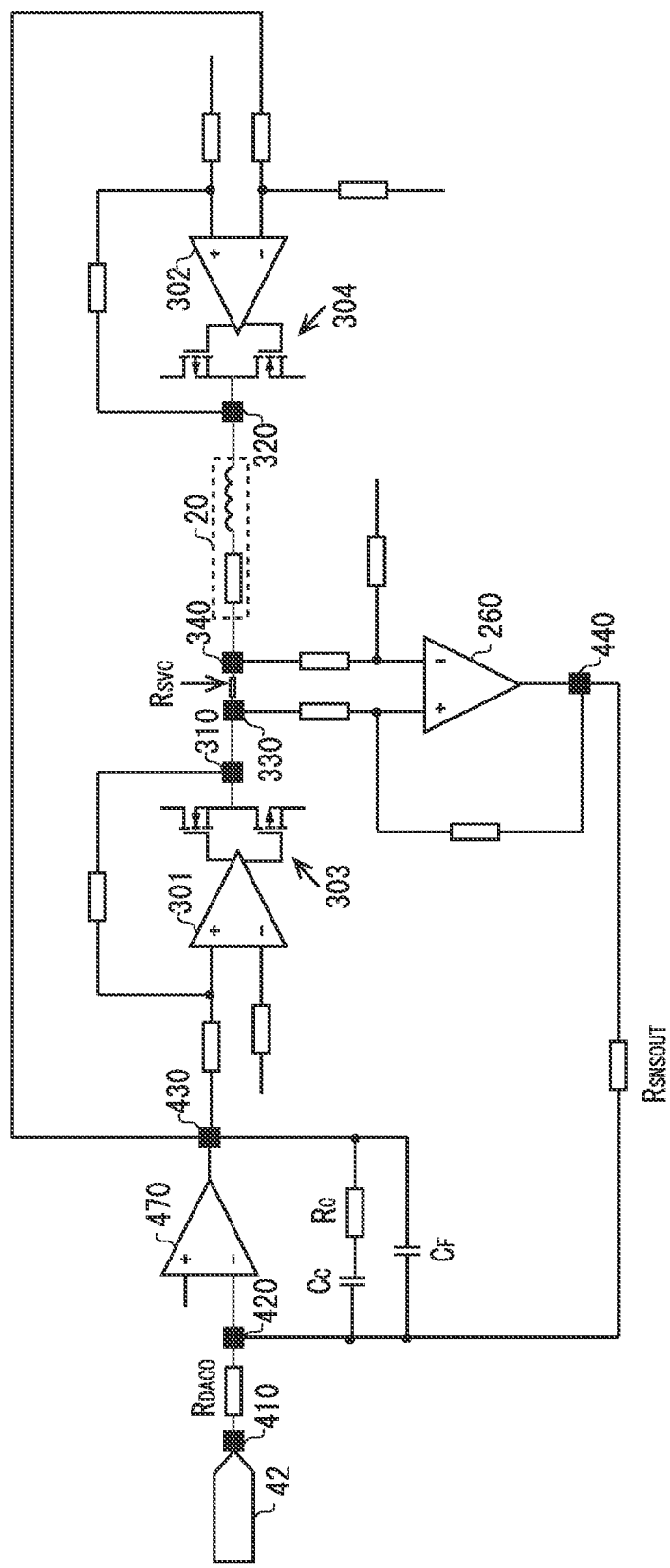
FIG. 5 is a schematic view of a circuit configuration relating to driving of the VCM driver 144 and detection of the drive current.

FIG. 5 is a schematic view of a circuit configuration relating to driving of the VCM driver 240 and detection of the drive current. In addition to the $A_{OUT}$ pin 310, the $B_{OUT}$ pin 320, the VSNSP pin 330, and the VSNSN pin 340, the combo IC 140 includes a DACO pin 410 for inputting a target value signal, an ERRI pin 420 for inputting an error signal, an ERRO pin 430 for outputting an error signal, and an SNSOUT pin 440 for outputting a drive current detection signal, as external pins relating to the driving of the VCM 20.

In the combo IC 140, the output of the VCM DAC 42 is electrically connected to the DACO pin 410. The ERRI pin 420 is electrically connected to the input of the error amplifier 470. The output of the error amplifier 470 is electrically connected to the ERRO pin 430. The ERRO pin 430 is input to both the amplification amplifier 301 and the amplification amplifier 302. The output of the detection amplifier 260 is electrically connected to the SNSOUT pin 440.

Outside the combo IC 140, one end of the resistor RDACO is electrically connected to the DACO pin 410. The other end of the resistor RDACO is electrically connected to the ERRI pin 420. One end of the resistor RSNSOUT is connected to the SNSOUT pin 440, and the other end of the resistor RSNSOUT is connected to the ERRI pin 420. Outside the combo IC 140, the capacitor $C_F$ is electrically connected between the ERRO pin 430 and the ERRI pin 420. Furthermore, $R_C$ and $C_C$ are connected in series between the ERRO pin 430 and the ERRI pin 420. The resistor $R_C$ and the capacitor $C_C$ are connected in parallel with the capacitor $C_F$. This is an exemplary embodiment of an analog compensation unit in a current loop, and the compensation unit is not limited to this example.

In the comparative example of FIGS. 4 and 5, the analog feedback control is performed such that the VCM 20 is supplied with a drive current corresponding to the output voltage of the VCM DAC 42. In order to perform this analog feedback control, it is necessary to be able to connect a capacitor $C_F$, a resistor $R_C$, and a capacitor $C_C$ to the outside of the combo IC 140 as compensation circuits for the error amplifier 470. Furthermore, in order to adjust the drive current detection value within the scope of the design, it is necessary to be able to connect a resistor $R_{DACO}$ and a resistor $R_{SNSOUT}$ to the outside of the combo IC 140. Furthermore, in order to connect the capacitor $C_F$, the resistor $R_C$, the capacitor $C_C$, the resistor $R_{DACO}$, and the resistor $R_{SNSOUT}$, it is necessary to provide the combo IC 140 with the DACO pin 410, the ERRI pin 420, the ERRO pin 430, and the SNSOUT pin 440.

In contrast to this, as shown in FIG. 3, for example, there is no need to provide the combo IC 40 with the resistor $R_{DACO}$, the resistor $R_{SNSOUT}$, the capacitor $C_F$, the resistor $R_C$, or the capacitor $C_C$. Furthermore, there is no need to provide the combo IC 40 with the DACO pin 410, the ERRI pin 420, the ERRO pin 430, or the SNSOUT pin 440. As a result, costs relating to the combo IC 40 can be reduced.

Figure 6:
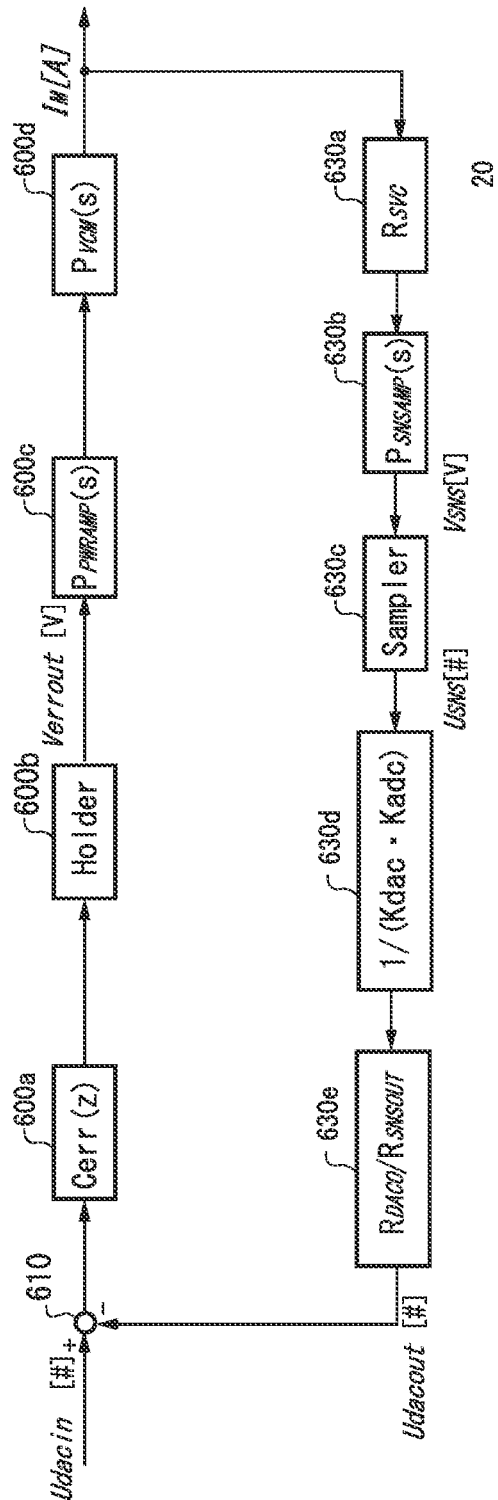
FIG. 6 shows an exemplary block line diagram of a control system for the drive current of the VCM 20.

FIG. 6 shows a block line diagram of a control system for the drive current of the VCM 20. This control system is shown by an adding point 610, a transmission element 600a and a transmission element 600b serving as feed-forward elements, a transmission element 600c and a transmission element 600d serving as control targets, and transmission elements 630a to 630e serving as feedback elements. The adding point 610 calculates a difference between $U_{dacin}$ serving as a reference input signal and $U_{dacout}$, which is the output of a feedback element. The adding point 610 subtracts $U_{dacout}$ from $U_{dacin}$.

$U_{dacin}$ corresponds to an input signal that is input to the VCM current controller 220 from the VCM controller 204. $U_{dacout}$ corresponds to an input signal that is input to the VCM current controller 220 from the VCM current ADC 210. $U_{dacin}$ and $U_{dacout}$ are both discrete-time signals.

The transmission element 600a represents the VCM current controller 220. The transmission element 600b represents a holder portion of the VCM DAC 42. $V_{errout}$ is an error signal in continuous time converted by the VCM DAC 42. The transmission element 600c represents a power amplifier 250. The transmission element 600d represents the VCM 20. Here, $I_M$ represents the drive current in continuous time supplied to the VCM 20.

The transmission element 630a represents the resistor $R_{SVC}$. The transmission element 630b represents the detection amplifier 260. Furthermore, $V_{SNS}$ represents the detection voltage obtained by detecting the drive current output from the detection amplifier 260. The transmission element 630c represents a sampling section of the VCM current ADC 210. Furthermore, $U_{SNS}$ represents an output voltage in discrete time resulting from the conversion by the VCM current ADC 210. The transmission element 630d is a proportional element representing the gain realized by the operation of the VCM DAC 42 and the VCM current ADC 210. The transmission element 630e is a proportional element for obtaining $U_{dacout}$, which is a signal with a level that can be compared to $U_{dacin}$. The transmission element 630e corresponds to $R_{DACO}/R_{SNSOUT}$.

Figure 7:
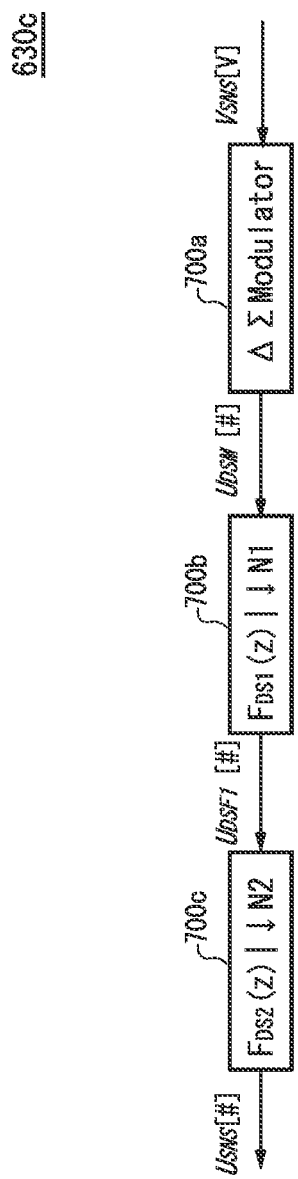
FIG. 7 shows an exemplary block line diagram of the transmission element 630c representing the VCM current ADC 210.

FIG. 7 shows a block line diagram of the transmission element 630c representing the VCM current ADC 210. In the present embodiment, the VCM current ADC 210 includes a ΔΣ modulator that performs over-sampling, a first decimation filter, and a second decimation filter. The transmission element 630c includes a transmission element 700a representing the ΔΣ modulator, a transmission element 700b representing the first decimation filter, and a transmission element 700c representing the second decimation filter. This is an exemplary embodiment of the VCM current ADC 210, but the present invention is not limited to using an AD conversion technique. As an example, there may be more than two stages of decimation filters.

The detection voltage $V_{SNS}$ in continuous time of the drive current is input to the transmission element 700a, and the transmission element 700a outputs the detection voltage $U_{DSM}$ that has been quantized to discrete time. The frequency of the sampling performed by the transmission element 700a, i.e., the over-sampling, is $f_s$.

The transmission element 700b represents the first decimation filter that performs down-sampling with a decimation order N1. In the present embodiment, the first decimation filter is realized by a Sinc filter. The output signal $U_{DSF1}$ output from the transmission element 700b is a signal with a frequency lower than $f_s$.

The transmission element 700c represents the second decimation filter that performs down-sampling with a decimation order N2. In the present embodiment, the second decimation filter is realized by a FIR filter. The output signal $U_{DSF2}$ output from the transmission element 700c is a signal with a frequency lower than the frequency of the output signal $U_{DSF1}$. Here, with $f_{bs}$ representing the frequency of the output signal $U_{DSF2}$, the over-sampling rate (OSR) is $f_s/f_{bs}$, i.e. N1×N2. With $f_b$ representing the bandwidth of the detection voltage $V_{SNS}$, $f_{bs}$ must fulfill the condition of $f_{bs}/2 > f_b$.

Figure 8:
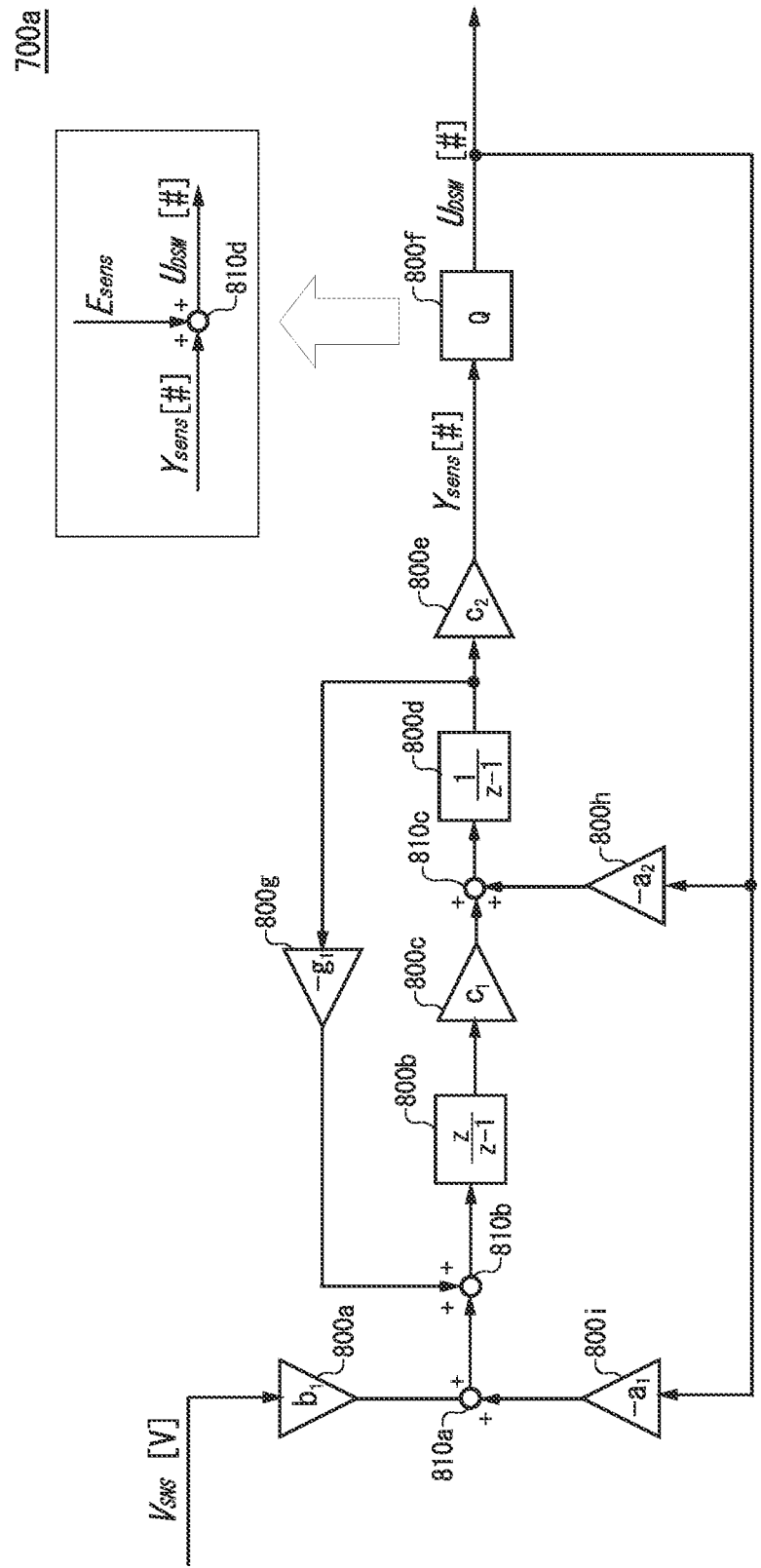
FIG. 8 shows a block line diagram of the transmission element 700a representing the ΔΣ modulator.

FIG. 8 shows a block line diagram of the transmission element 700a representing the ΔΣ modulator. In the present embodiment, the ΔΣ modulator is realized by a second order ΔΣ modulator. The transmission element 700a includes transmission elements 800a to 800i and adding points 810a to 810c.

The transmission element 800f represents a quantizing unit. The quantizing unit can be equivalently expressed by a model that adds quantization noise to the input signal. As shown in FIG. 8, the transmission element 800f is represented by an equivalent model that adds together the continuous time voltage signal $Y_{sens}$, which is the input signal input to the quantizing unit, and the quantization noise $E_{sens}$ using the adding point 810e, and outputs a digital signal $U_{DSN}$.

The output $U_{DSN}(z)$ of the transmission element 700a is expressed as $U_{DSN}(z) = G_{STF}(x) \times V_{SNS} + H_{NTF}(z) \times E_{sens}(z)$. Here, $G_{STF}(z)$ is a signal transfer function and $H_{NTF}(z)$ is a noise transfer function. The characteristics of $G_{STF}$ and $H_{NTF}$ are described further below.

Figure 9:
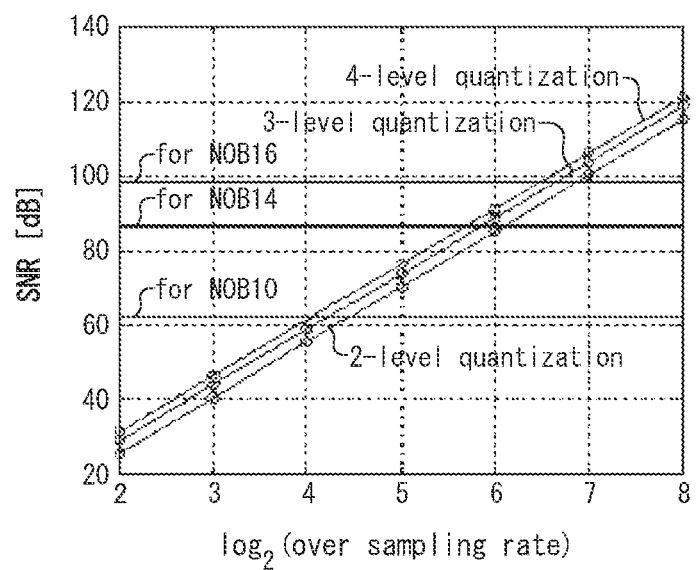
FIG. 9 shows the SN ratio of the quantization error for OSR.

FIG. 9 shows the SN ratio of the quantization error for OSR. The horizontal axis is $\log_2(OSR)$, and the vertical axis represents the SNR of the quantization error. As can be seen from FIG. 9, in order to realize 14 effective bits, an OSR of at least 64 times is necessary. When using an OSR of 64 times, quantization of three or more values is necessary. Accordingly, in order to achieve the same error characteristics as in a case where analog feedback control is performed using a 14-bit DAC, quantization of three or more values with an OSR of 64 times is necessary.

Figure 10:
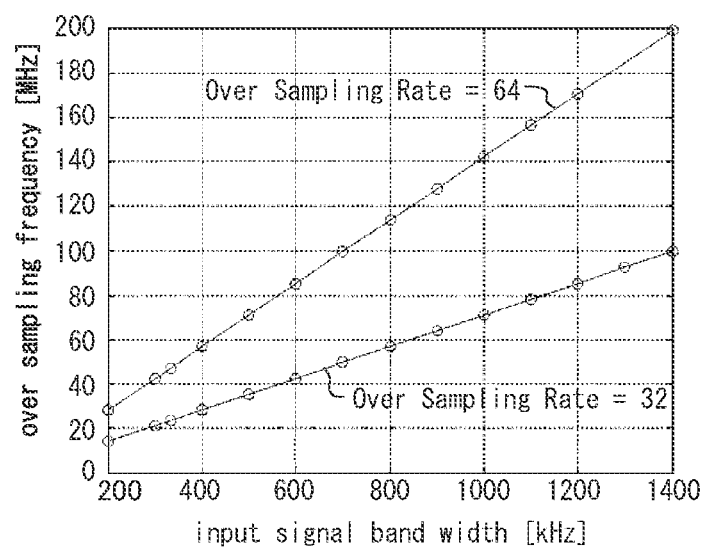
FIG. 10 shows a relationship of the over-sampling frequency relative to the bandwidth of the input signal.

FIG. 10 shows a relationship of the over-sampling frequency relative to the bandwidth of the input signal. With $f_b$ representing the bandwidth of the input signal, the practical over-sampling frequency $f_s$ preferably satisfies the condition of $f_s/2*0.9 > f_b$. Here, 0.9 is a safe rate. Accordingly, when it is assumed that the bandwidth needed for the input signal is 1 MHz, $f_s$ must be greater than approximately 142.2 MHz.

Figure 11:
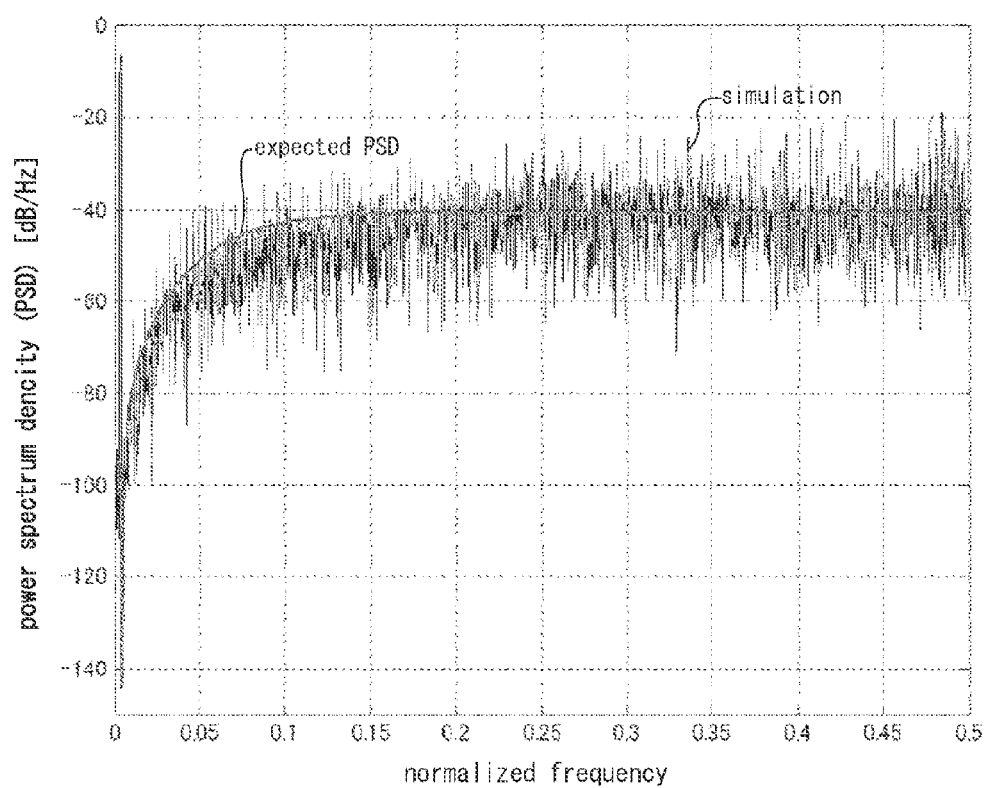
FIG. 11 shows the SN ratio in simulation results with an OSR of 64 times.
Figure 12:
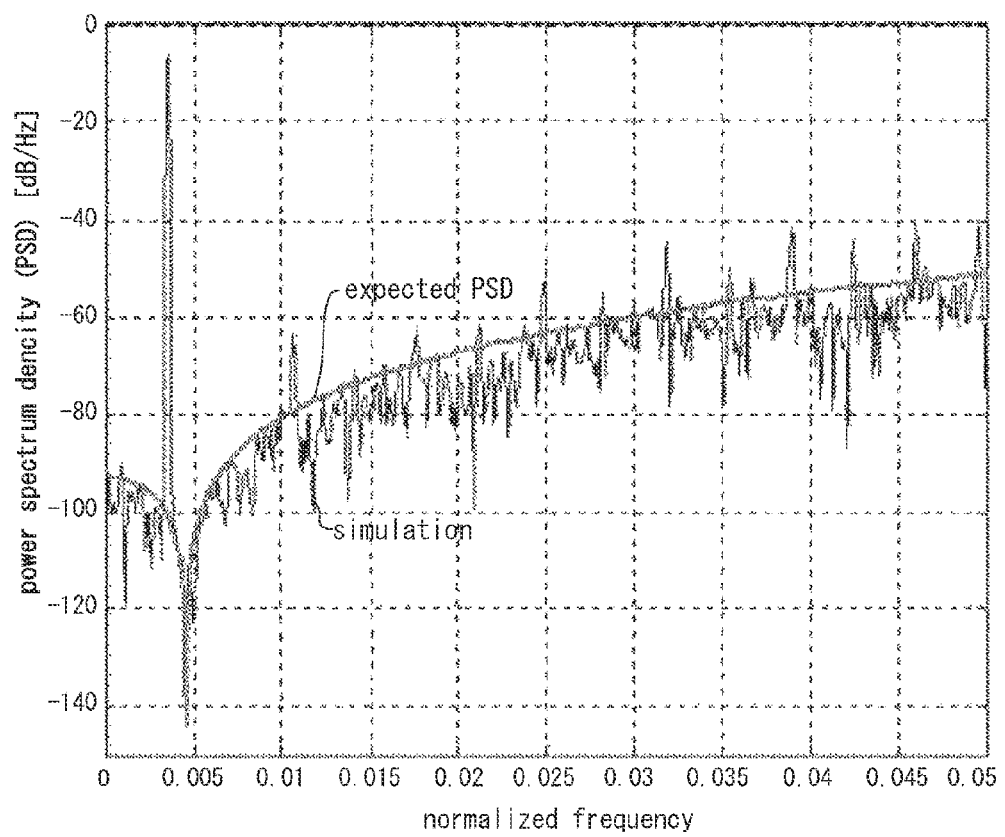
FIG. 12 shows an enlarged view of the range from 0 to 0.5 on the horizontal axis of the graph in FIG. 11.

FIG. 11 shows the SN ratio in simulation results with an OSR of 64 times. FIG. 12 shows an enlarged view of the range from 0 to 0.5 on the horizontal axis of the graph in FIG. 11. In the graphs of FIGS. 11 and 12, the horizontal axis is a frequency obtained by normalizing for $f_s$ (normalized frequency) and the vertical axis is the power spectrum density of the noise. The power spectrum density is obtained through a simulation using a test signal with a normalized frequency of 0.0035.

As seen from FIG. 11, in the high-frequency range, the power spectrum density of the noise is less than −40 dB/Hz. Furthermore, the power spectrum density of the noise is approximately −90 dB at the frequency corresponding to 1 MHz (normalized frequency of approximately 0.007), which is the bandwidth of the input signal.

Figure 13:
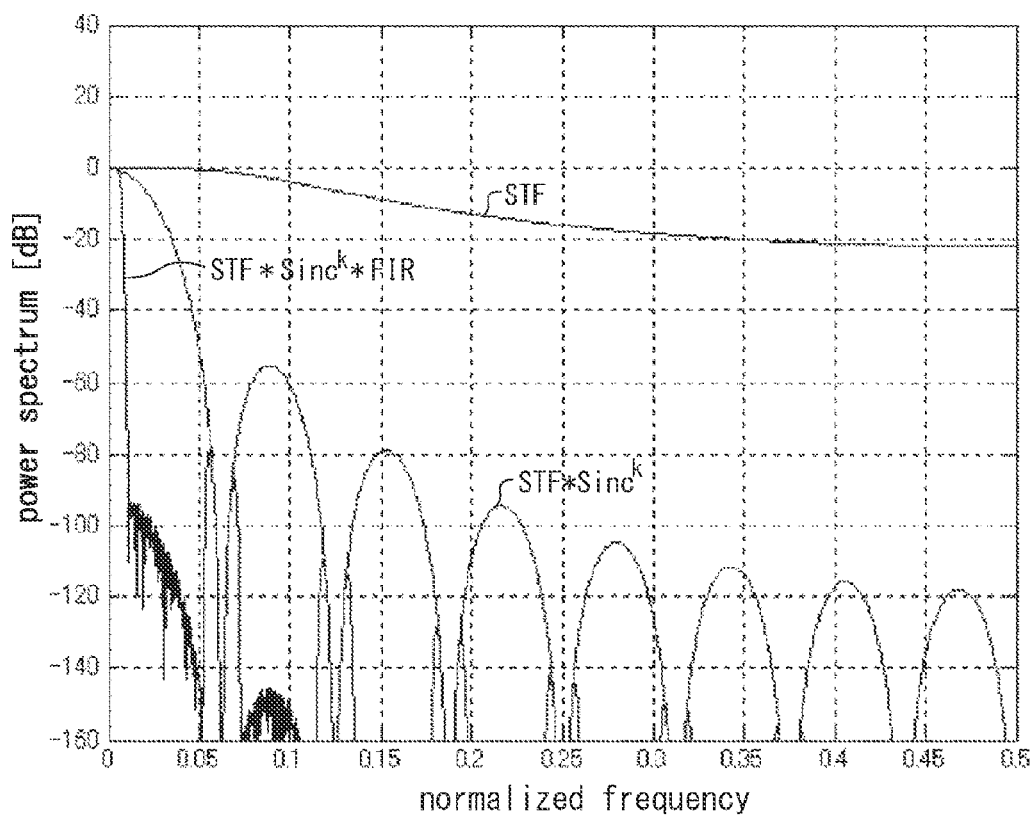
FIG. 13 shows the frequency dependence characteristic of the power spectrum (gain) of the signal transmission function $G_{STF}$.
Figure 14:
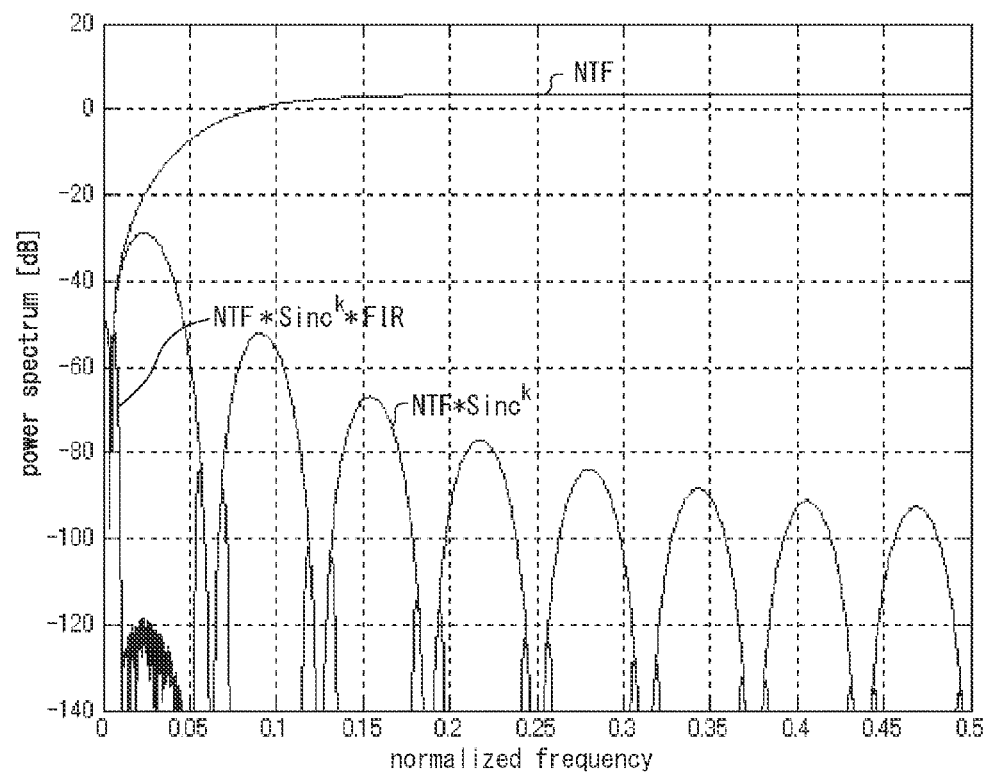
FIG. 14 shows the frequency dependence characteristic of the power spectrum (gain) of the noise transfer function $N_{NTF}$.
Figure 15:
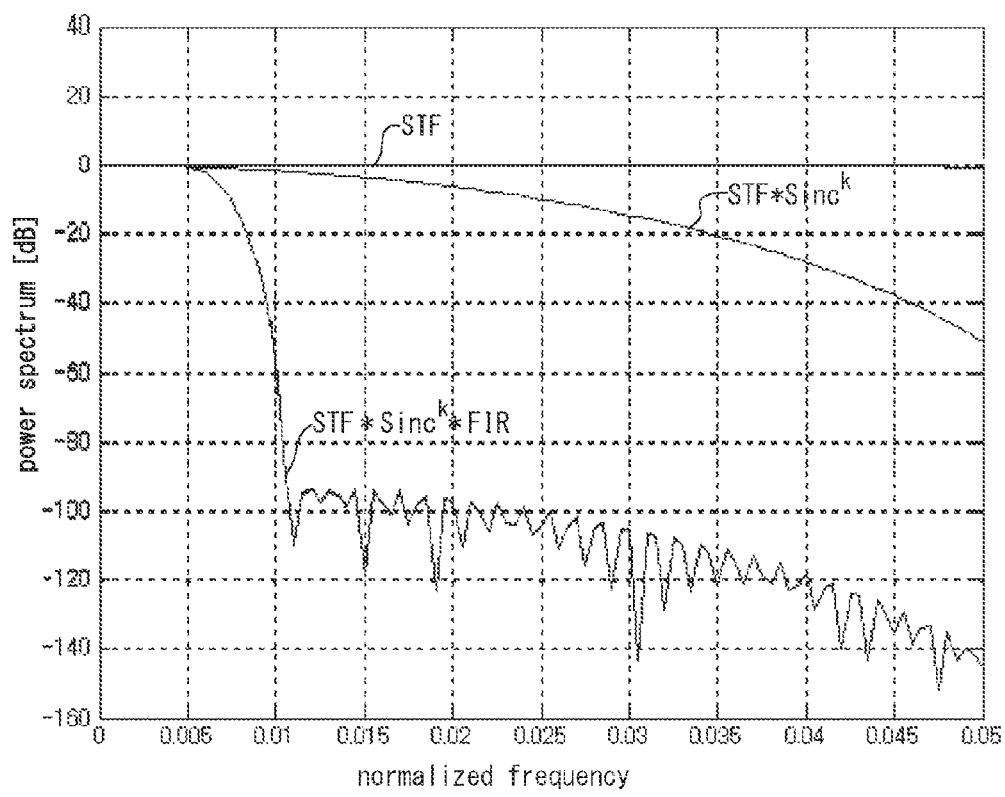
FIG. 15 shows an enlarged view of the range from 0 to 0.5 on the horizontal axis of the graph in FIG. 11.

FIG. 13 shows the frequency dependence characteristic of the power spectrum (gain) of the signal transmission function $G_{STF}$. FIG. 14 shows the frequency dependence characteristic of the power spectrum (gain) of the noise transfer function $N_{NTF}$. FIG. 15 shows an enlarged view of the range from 0 to 0.5 on the horizontal axis of the graph in FIG. 11. The horizontal axis in FIGS. 13, 14, and 15 is the normalized frequency. The first decimation filter is a fourth-order Sinc filter, and the decimation orders for the first decimation filter and the second decimation filter are respectively N1=16 and N2=4.

As seen from FIGS. 13 and 15, in the frequency region where the alias components appear, the power spectrum of the output of the second decimation filter is held below −90 dB. Furthermore, as seen from FIG. 14, the quantization noise is held below −40 dB. Accordingly, the quantization noise caused by the quantizing unit is restricted to a sufficiently low level by the first decimation filter and the second decimation filter.

Figure 16:
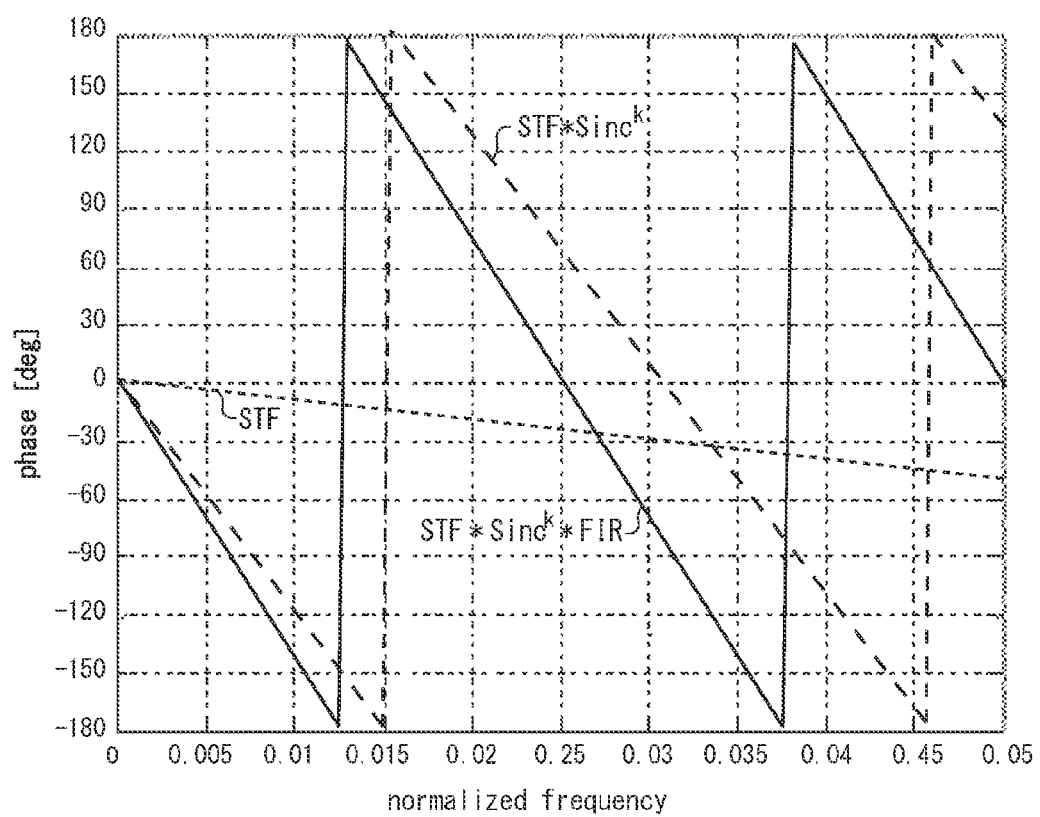
FIG. 16 shows the phase characteristics for the signal transfer function STF.

FIG. 16 shows the phase characteristics for the signal transfer function STF. The horizontal axis in FIG. 16 is the normalized frequency, and the vertical axis is the phase shift. As shown in FIG. 16, at the frequency corresponding to 1 MHz (normalized frequency of approximately 0.007), there is a fair amount of phase shift in the output of the second decimation filter.

Figure 17:
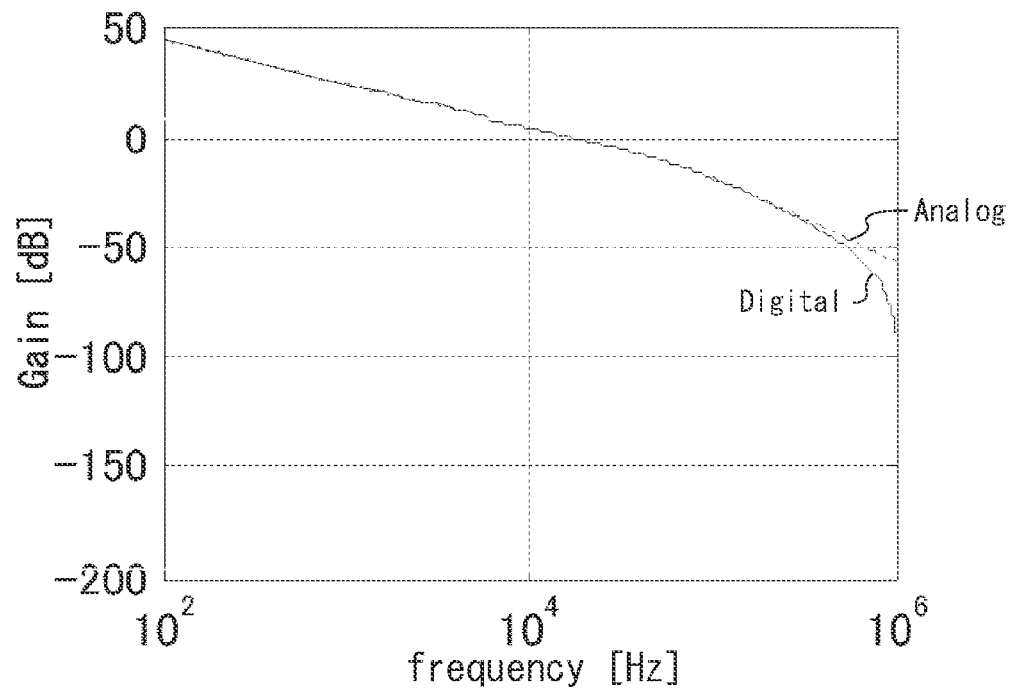
FIG. 17 shows the open loop gain characteristic of the drive current control system.
Figure 18:
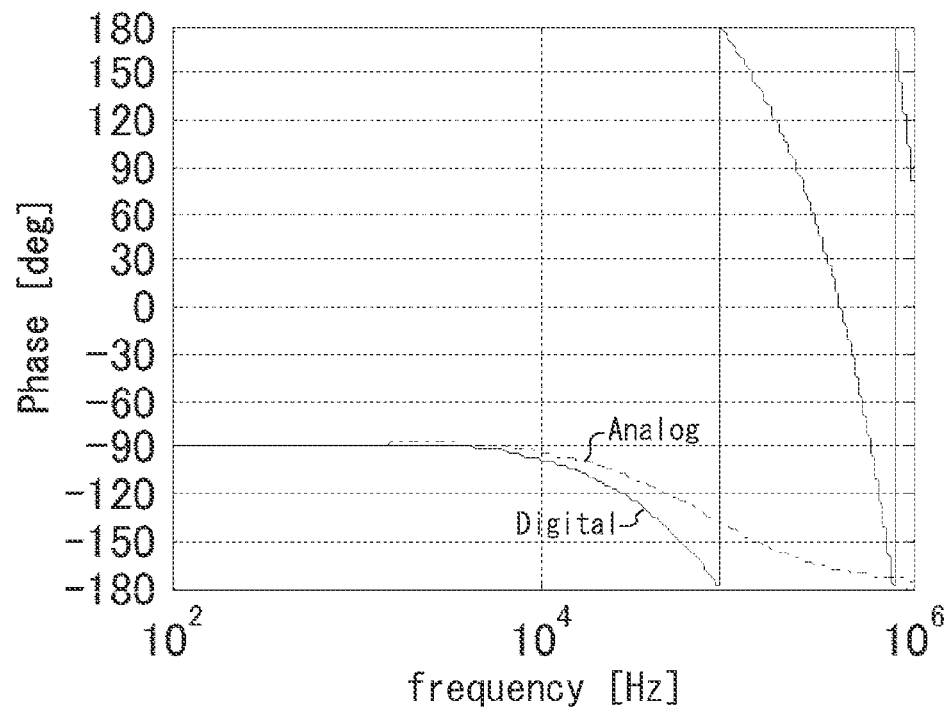
FIG. 18 shows open loop phase characteristic.
Figure 19:
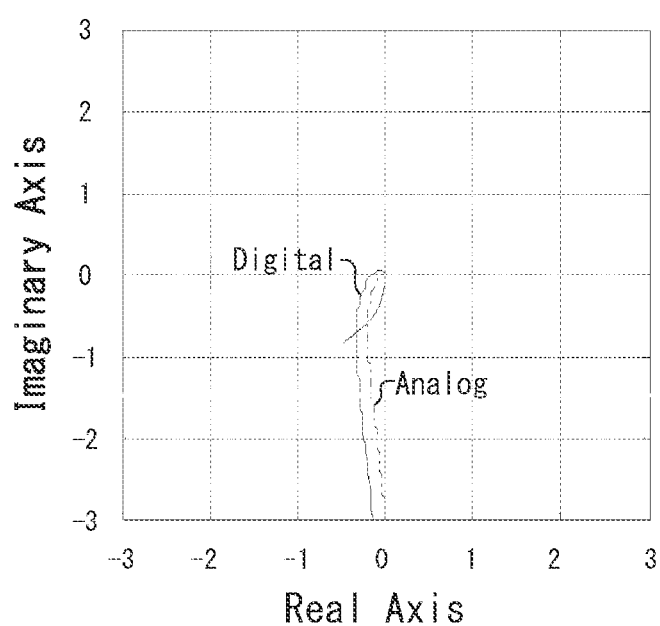
FIG. 19 is a Nyquist line diagram.
Figure 20:
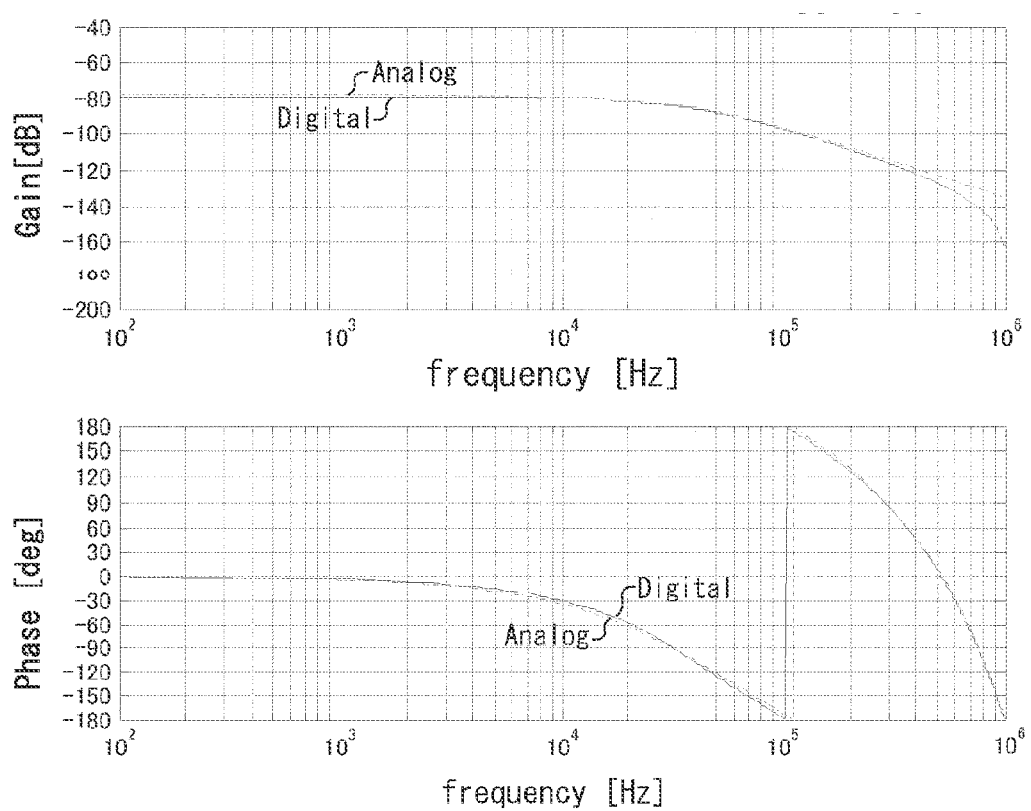
FIG. 20 shows the closed loop gain characteristic and closed loop phase characteristic of the drive current control system.

FIG. 17 shows the open loop gain characteristic of the drive current control system. FIG. 18 shows the open loop phase characteristic. FIG. 19 is a Nyquist line diagram. FIG. 20 shows the closed loop gain characteristic and closed loop phase characteristic of the drive current control system. The horizontal axis in FIGS. 17, 18, and 20 is the actual frequency.

In a practical example of performing analog feedback control of the drive current, the phase margin of the open loop characteristic is approximately 80°. Furthermore, in a closed loop gain characteristic, the cutoff frequency is 23 kHz and the phase delay is approximately 69°.

With the control system of the embodiment described above that performs digital feedback control of the drive current, when it is assumed that the OSR is 64 times, the over-sampling frequency is 142 MHz, and the bandwidth of the input signal is 1 MHz, the phase margin of the open loop characteristic is approximately 71°. Furthermore, the cutoff frequency is 23 kHz and the phase delay is 68°. From the Nyquist line diagram of FIG. 19, it can be seen that a stable open loop characteristic is obtained. Based on the above, it can be seen that the digital feedback control system described above can provide a control system with a transfer function equivalent to that seen in analog feedback control of a drive current. The poles and zero-points obtained are the same as those obtained with an analog loop.

Figure 21:
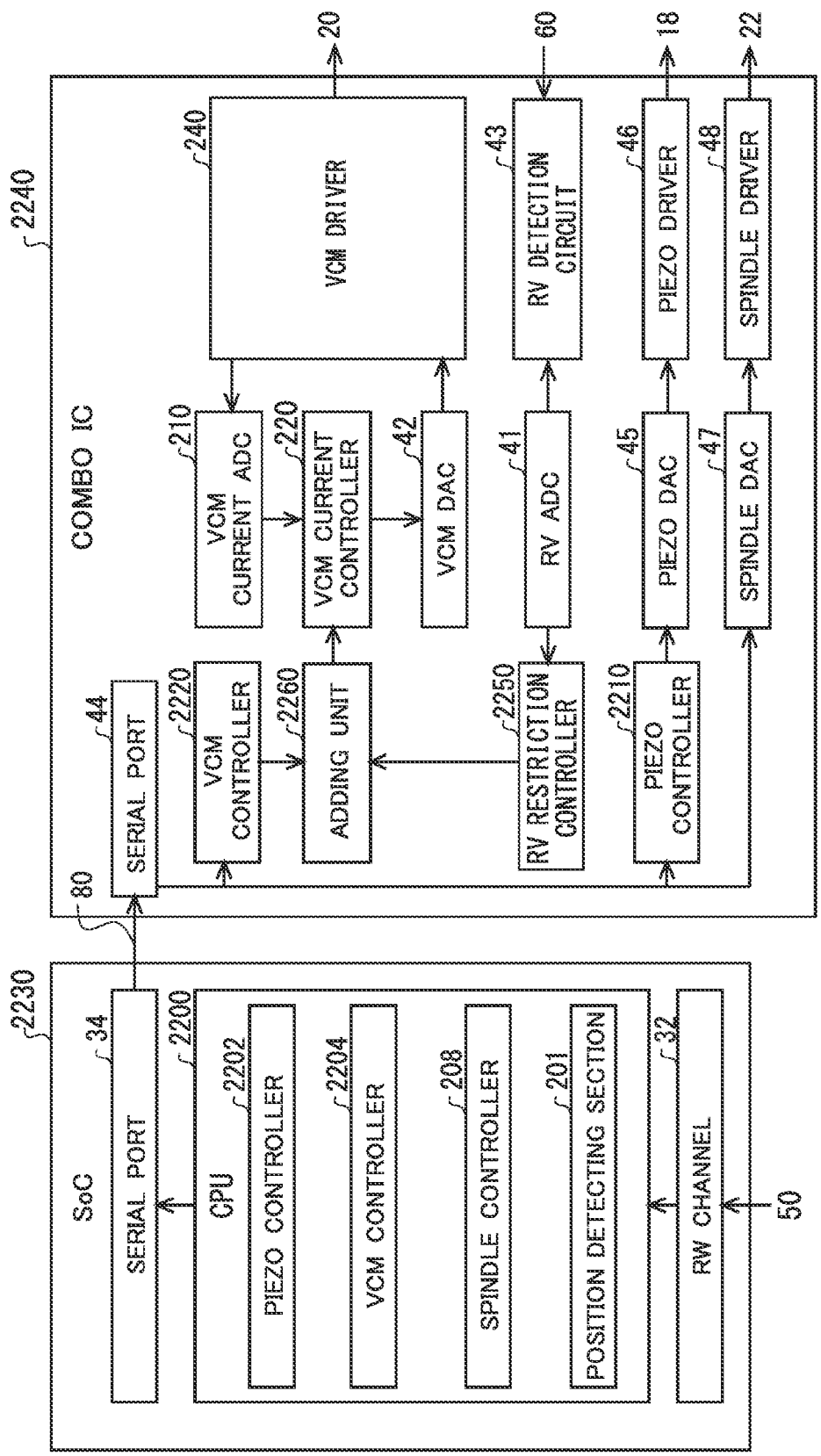
FIG. 21 shows an exemplary SoC 2230 and a combo IC 2210 of a hard disk apparatus according to a second embodiment.

FIG. 21 shows a SoC 2230 and a combo IC 2240 of a hard disk apparatus according to a second embodiment.

The SoC 2230 includes an RW channel 32, a CPU 2200, and a serial port 34. The CPU 2200 includes a position calculating section 201, a piezo controller 2202, a VCM controller 2204, and a spindle controller 208.

The combo IC 2240 includes an RV ADC 41, a VCM DAC 42, an RV detection circuit 43, a serial port 44, a piezo DAC 45, a piezo driver 46, a spindle DAC 47, a spindle driver 48, a VCM current controller 220, a VCM current ADC 210, an adding unit 2260, a VCM driver 240, a piezo controller 2210, a VCM controller 2220, and an RV restriction controller 2250.

In the CPU 2200, the piezo controller 2202 generates a control signal relating to a target value for the application voltage of the piezo actuator 18, according to single-rate control. The VCM controller 2204 generates a control signal relating to a target value for the drive current of the VCM 20, according to single-rate control. In this way, the control signal relating to the target value for the application voltage of the piezo actuator 18 and the control signal relating to the target value for the drive current of the VCM 20 are each generated with the same period as the detection period for the position of the head 14. The piezo controller 2202 and the VCM controller 2204 each have poles and zero-points at frequencies less than the Nyquist frequency.

The serial port 34 outputs the digital signals that are the control signal relating to the target value for the drive current of the VCM 20, the control signal relating to the target value for the application voltage of the piezo actuator 18, and the target value signal for the drive current of the spindle motor 22 to the combo IC 2240, as serial data. The serial port 44 acquires the digital signals output from the serial port 34.

In the combo IC 2240, the VCM controller 2220 generates the digital control signal indicating the target value for the drive current of the VCM 20, according to multirate control, based on the single-rate control signal relating to the target value for the drive current of the VCM 20. The control signal generated by the multirate VCM controller 2220 has a period that is shorter than the head 14 position detection period. The control signal generated by the VCM controller 2220 is output to the adding unit 2260. The multirate VCM controller 2220 has poles and zero-points greater than or equal to the Nyquist frequency.

The angular acceleration detection value output from the RV ADC 41 is input to the RV restriction controller 2250. The RV restriction controller 2250 generates the digital control signal indicating the correction value of the drive current of the VCM 20, based on this angular acceleration detection value. The period of the digital control signal generated by the RV restriction controller 2250 is the same as the period of the digital control signal generated by the multirate VCM controller 2220. The control signal generated by the RV restriction controller 2250 is output to the adding unit 2260.

The adding unit 2260 adds together the digital control signal generated by the multirate VCM controller 2220 and the digital control signal generated by the RV restriction controller 2250, and outputs the resulting signal to the VCM current controller 220. The VCM current controller 220 generates a digital control signal indicating the target value for the drive current of the VCM 20, based on the digital control signal output from the adding unit 2260 and the digital detection value for the drive current of the VCM 20 output from the VCM current ADC 210, and outputs this signal to the VCM DAC 42. The VCM DAC 42 converts the digital control signal output from the VCM current controller 220 into an analog control signal, and outputs the analog control signal to the VCM driver 240.

The piezo controller 2210 generates a digital control signal indicating the target value for the application voltage of the piezo actuator 18, according to multirate control, based on the single-rate control signal relating to the application voltage of the piezo actuator 18. The control signal generated by the piezo controller 2210 is generated to have a period that is shorter than the head 14 position detection period. The piezo controller 2210 has poles and zero-points at frequencies greater than or equal to the Nyquist frequency.

Figure 22:
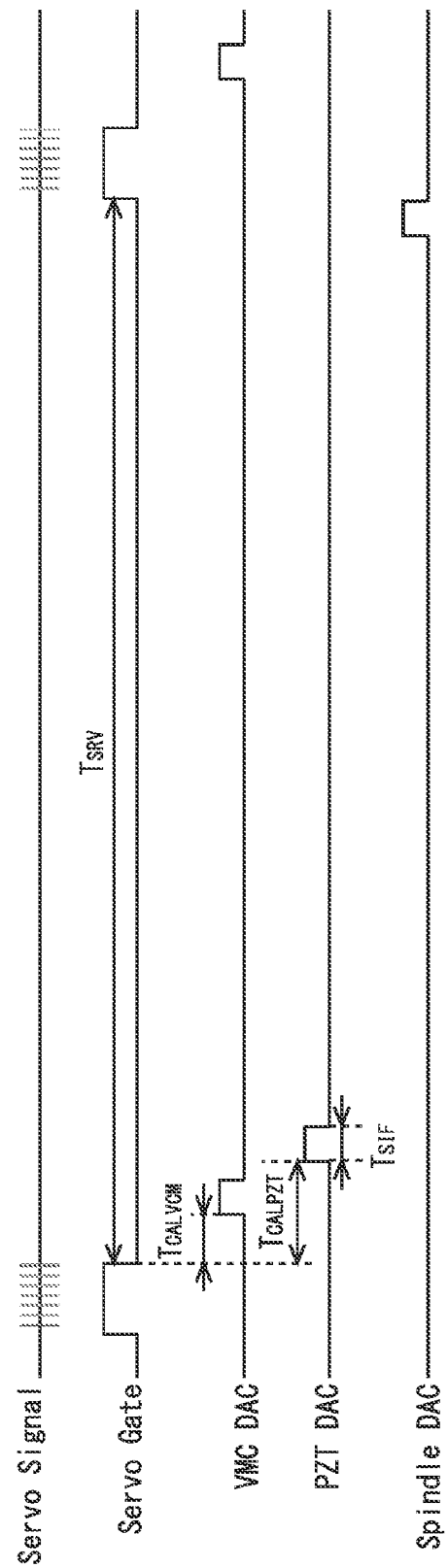
FIG. 22 shows an exemplary timing chart for the output of the control signals from the SoC 2230 to the combo IC 2240.

FIG. 22 shows a timing chart for the output of the control signals from the SoC 2230 to the combo IC 2240. When a servo read signal is generated as a result of the head 14 passing through the servo region, the servo gate is turned ON, and when the generation of the servo read signal ends as a result of the head 14 no longer passing through the servo region, the servo gate is turned OFF. The SoC 2230 outputs various control signals to the combo IC 2240 through the SIF 80, during an interval from the timing at which the servo gate is turned OFF to a timing at which the servo gate is then turned ON. The interval $T_{SRV}$ is the interval from the timing at which the servo gate is turned OFF to the timing at which the servo gate is turned ON.

When the head 14 position is detected from the servo information, after the time $T_{CALVCM}$ has passed, the VCM controller 2204 outputs the control signal. The time $T_{CALVCM}$ is the time needed to calculate the control signal relating to the drive current of the VCM 20. Furthermore, when the head 14 position is detected, after the time $T_{CALPZT}$ has passed, the piezo controller 2202 outputs a control signal. The time $T_{CALPZT}$ is the time needed to calculate the control value relating to the application current of the piezo actuator 18. The spindle controller 208 can output a control signal one time during the interval $T_{SRV}$.

The time $T_{SIF}$ is the time needed to transmit each of the control signals as a serial signal. In the present embodiment, single-rate control is performed by the SoC 2230. Therefore, the control signals to be transmitted during the interval $T_{STB}$ are, at most, one control signal for the drive current of the VCM 20, one control signal for the piezo actuator 18, and one control signal for the drive current of the spindle motor 22.

Figure 23:
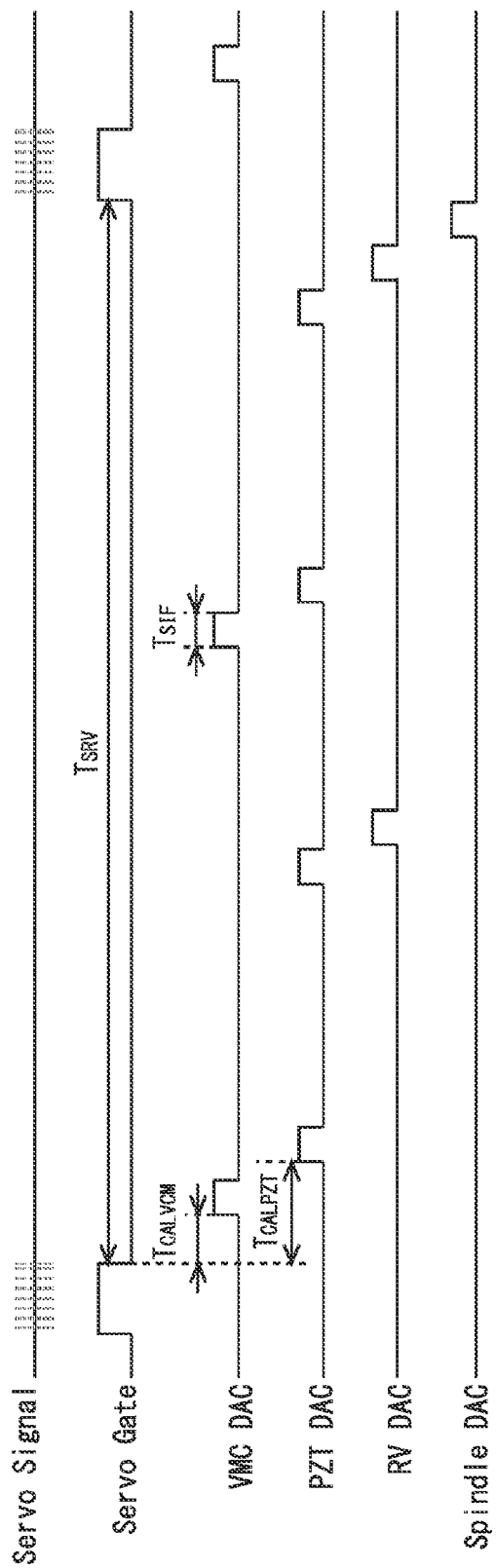
FIG. 23 shows an exemplary timing chart for the output of control signals from the SoC 30 to the combo IC 40 according to the first embodiment, as a comparative example.

FIG. 23 shows a timing chart for the output of control signals from the SoC 30 to the combo IC 40 according to the first embodiment, as a comparative example. In the first embodiment, multirate control is performed by the SoC 30. Therefore, in the first embodiment, the control signals to be transmitted during the interval $T_{SRV}$ are, at most, two control signals for the drive current of the VCM 20, four control signals for the piezo actuator 18, two control signals for the correction value for the drive current of the VCM 20, and one control signal for the drive current of the spindle motor 22. Accordingly, $T_{SRV}$ must satisfy the restrictive condition that $T_{SRV} > 9 T_{SIF}$. In general, assuming that the multirate numbers relating to the control of the drive current of the VCM 20, control of the application voltage of the piezo actuator 18, and restriction of the RV are respectively $N_{VCM}$, $N_{PZT}$, and $N_{RV}$, this restrictive condition becomes $T_{SRV} > (N_{VCM} + N_{PZT} + N_{RV} + 1) \times T_{SIF}$.

In contrast to this, with the second embodiment described in relation to FIGS. 21 and 22, this restrictive condition is loosened to be $T_{SRV} > 3T_{SIF}$. Usually, when the storage density of a disk is increased, $T_{SRV}$ becomes shorter and the traffic of control signals transmitted on the SIF 80 becomes denser. Therefore, the ability to increase density of a disk can be limited by $T_{SIF}$. However, with the second embodiment, the limitation placed on the ability to increase density of the disk by $T_{SIF}$ can be restricted.

Figure 24:
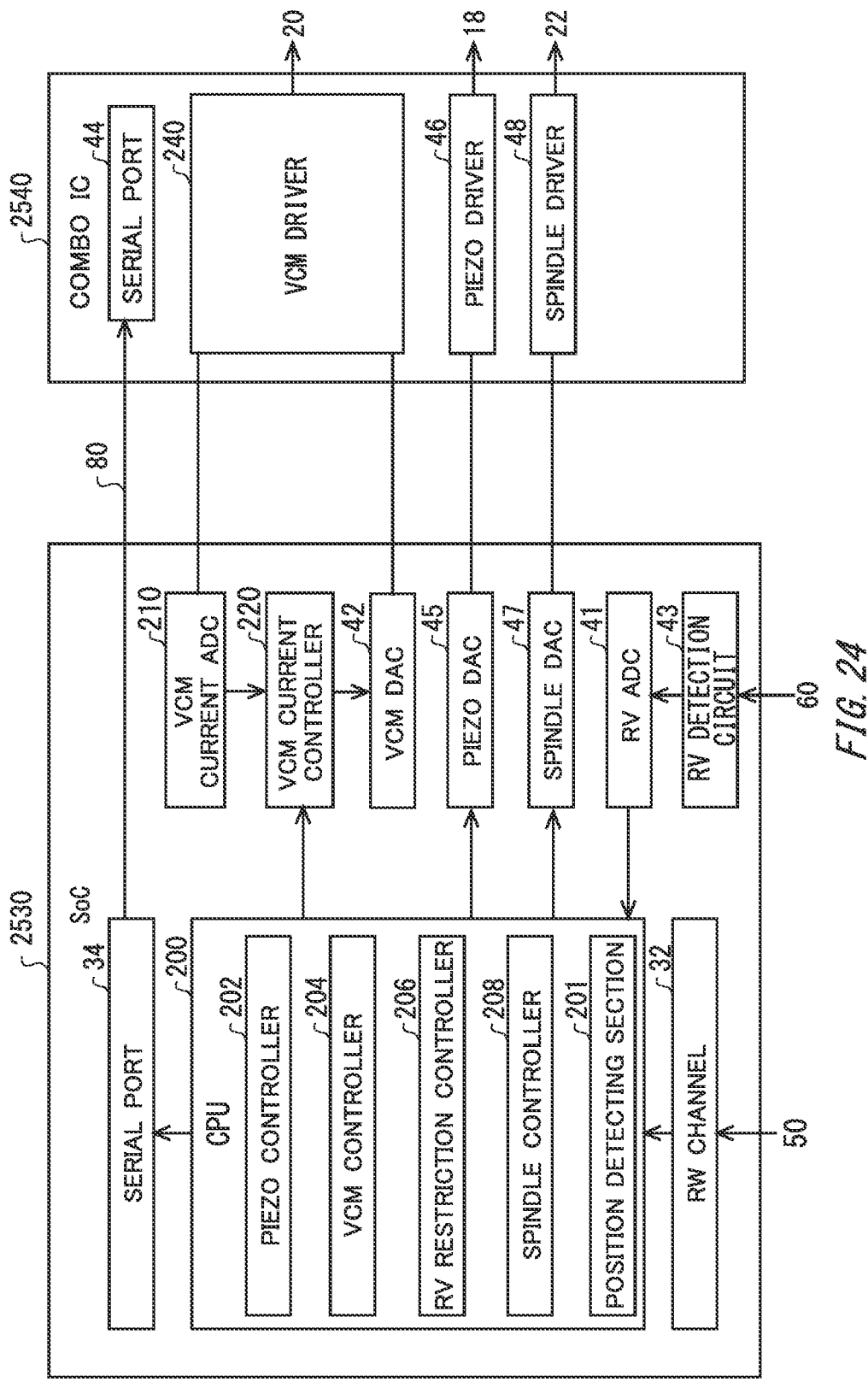
FIG. 24 shows an exemplary SoC 2530 and a combo IC 2540 of a hard disk apparatus according to a third embodiment.

FIG. 24 shows a SoC 2530 and a combo IC 2540 of a hard disk apparatus according to a third embodiment. In the SoC 2530 of the present embodiment, the VCM current ADC 210, the VCM current controller 220, the VCM DAC 42, the RV ADC 41, the RV detection circuit 43, the piezo DAC 45 and the spindle DAC 47 of the combo IC 40 according to the first embodiment are implemented. In the combo IC 2540, the VCM driver 240, the piezo driver 46, and the spindle driver 48 are implemented. The VCM current ADC 210, the VCM current controller 220, the VCM DAC 42, the RV ADC 41, the RV detection circuit 43, the piezo DAC 45, and the spindle DAC 47 are not implemented in the combo IC 2540.

In the SoC 2530, the target value for the drive current of the VCM 20 calculated by the VCM controller 204 is output to the VCM current controller 220 from the CPU 200. Furthermore, the correction value for the target value signal for the drive current calculated by the RV restriction controller 206 is output from the CPU 200 to the VCM current controller 220. In the same manner, the target value signal for the application voltage of the piezo actuator 18 is output from the CPU 200 to the piezo DAC 45. The target value signal for the drive current in each phase of the spindle motor 22 is output to the spindle DAC 47. The output of the RV ADC 41 is output to the CPU 200.

With the present embodiment, the control signals relating to control of the VCM 20, the piezo actuator 18, and the spindle motor 22 do not need to be transmitted to the combo IC 2540 through the SIF 80. Furthermore, the resistor $R_{DACO}$, the capacitor $C_C$, the resistor $R_C$, the capacitor $C_F$, and the resistor $R_{SNSOUT}$ do not need to be provided as external components. Yet further, although there is no need to provide the ERRI pin and the ERRO pin, it is instead necessary to provide the combo IC 2540 with a pin for transmitting the analog signal of the detection value for the drive current to the VCM current ADC 210 and a pin for acquiring the analog signal output by the VCM DAC 42.

The SoC 2530 according to the third embodiment is provided separately from the combo IC 2510 in which the VCM driver 240 is implemented. The analog control signals are transmitted to the combo IC 2540 through a first analog signal line connected between the SoC 2530 and the combo IC 2540. The analog current amount signal is transmitted to the SoC 2530 through a second analog signal line connected between the SoC 2530 and the combo IC 2540.

In other embodiments, the VCM current ADC 210, the VCM current controller 220, and the VCM DAC 42 may be implemented in the SoC 2530, and the RV ADC 41, the RV detection circuit 43, the piezo DAC 45, and the spindle DAC 47 may be implemented in the combo IC 2540.

In other embodiments, the VCM current ADC 210 and VCM current controller 220 do not need to be implemented in either the SoC 2530 or the combo IC 2540, and the VCM driver 144 shown in FIG. 4 may be used instead of the VCM driver 240. In this case, the target value for the drive current calculated by the VCM controller 204 is output to the VCM DAC 42.

Figure 25:
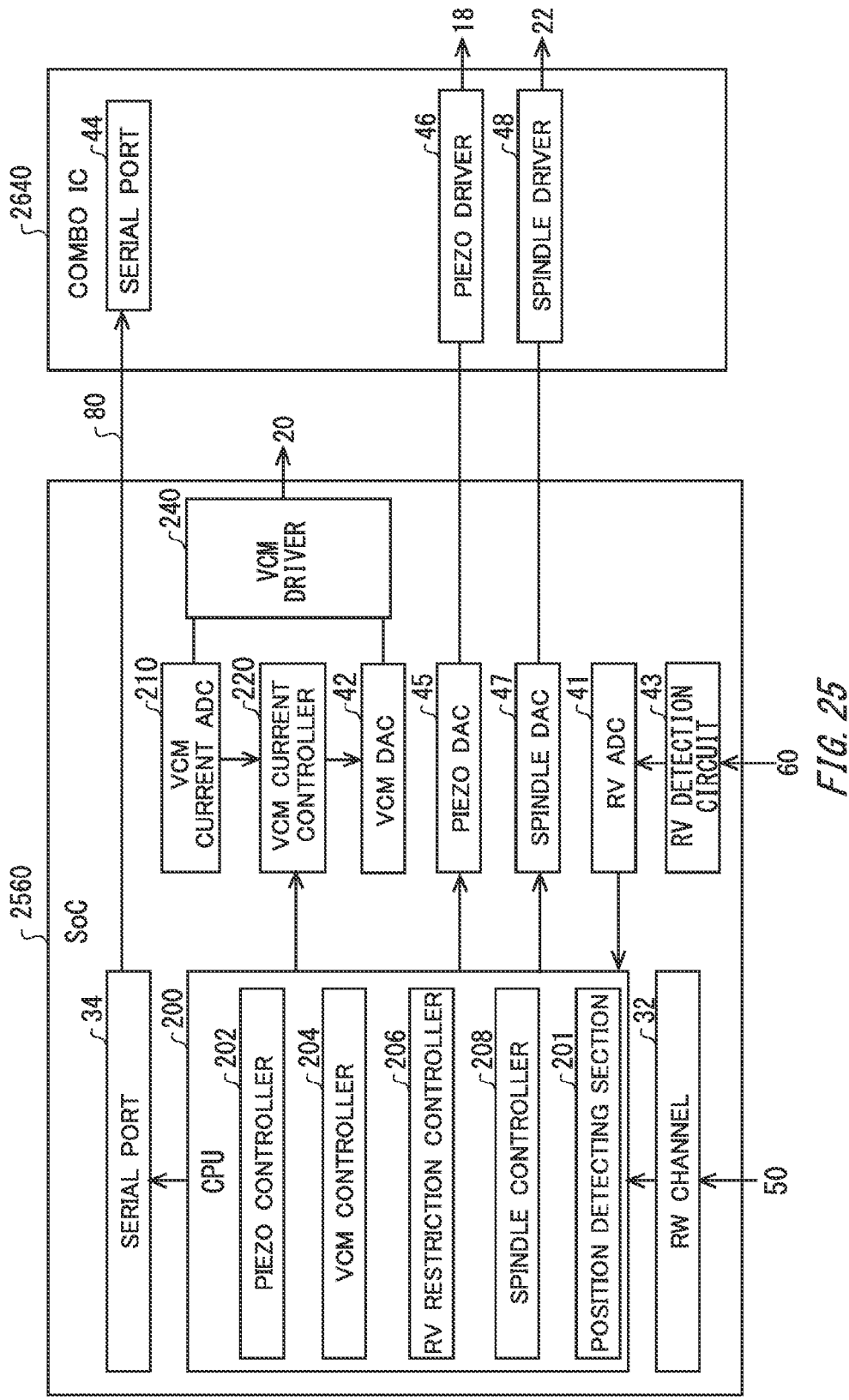
FIG. 25 shows an exemplary SoC 2630 and a combo IC 2640 of a hard disk apparatus according to a fourth embodiment.

FIG. 25 shows a SoC 2630 and a combo IC 2640 of a hard disk apparatus according to a fourth embodiment. Unlike the SoC 2530 of the third embodiment, the SoC 2630 of the present embodiment includes the VCM driver 240. Therefore, compared to the hard disk apparatus of the third embodiment, there is no need to provide the combo IC 2640 with the pine for outputting the detection value of the drive current to the VCM current ADC 210 and the pin for acquiring the analog signal output by the VCM DAC 42.

In other embodiments, the VCM current ADC 210, the VCM current controller 220, and the VCM DAC 42 may be implemented in the SoC 2630, and the RV ADC 41, the RV detection circuit 43, the piezo DAC 45, and the spindle DAC 47 may be implemented in the combo IC 2640.

In other embodiments, the VCM current ADC 210 and VCM current controller 220 do not need to be implemented in either the SoC 2630 or the combo IC 2640, and the VCM driver 144 shown in FIG. 4 may be used instead of the VCM driver 240. In this case, the target value for the drive current calculated by the VCM controller 204 is output to the VCM DAC 42.

As described in relation to the SoC 2530 of the third embodiment and the SoC 2630 of the fourth embodiment, the VCM current ADC 210, the VCM current controller 220, and the VCM DAC 42 may be implemented along with the VCM controller 204 in one SoC. With the third and fourth embodiments, in the same manner as with the second embodiment, the limitation imposed by $T_{SIF}$ on the ability to increase the density of the disk can be restricted.

Among the functions described above, at least a portion of the functions of the SoC 30, the combo IC 40, the SoC 2230, the combo IC 2240, the SoC 2530, and the SoC 2630 may be realized through machine readable instructions. The machine readable instructions may be recorded on at least one of a nonvolatile storage medium and a volatile storage medium. When the machine readable instructions are read from the storage medium by the processor of a CPU, for example, the processor may perform at least a portion of the steps for realizing at least a portion of the functions of the SoC 30, the combo IC 40, the SoC 2230, the combo IC 2240, the SoC 2530, and the SoC 2630.

The disk apparatus may be, instead of a magnetic storage apparatus such as a hard disk apparatus, an optical disk apparatus that stores data optically or a magneto-optical disk apparatus that stores data magneto-optically, for example.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:
1. A control device comprising:
an analog-to-digital A/D converting module configured to sample an analog current amount signal indicating a current amount for a drive current of a motor and convert the analog current amount signal into a digital current amount signal;
a control signal generating module configured to, according to digital control, generate a digital control signal corresponding to a manipulation amount of the drive current based on a difference between the current amount indicated by the digital current amount signal and a target value;
a control circuit having a prescribed period signal generating module that, based on a detection value for a position of a head sampled with a prescribed period, is configured to generate a control signal relating to a current amount with the prescribed period;
a multirate processing module included in the drive circuit that, based on the control signal generated with the prescribed period by the prescribed period signal generating module, is configured to generate a target value for the current amount with a period shorter than the prescribed period and output the generated target value to the control signal generating module; and
a digital-to-analog D/A converting module configured to convert the digital control signal into an analog control signal and output the analog control signal to generate the drive current.

2. The control device according to claim 1, wherein the A/D converting module, the control signal generating module, and the D/A converting module are included in one integrated circuit that additionally includes a target value generating module that generates a target value signal indicating the target value of the current amount based on a detection value for a position of a head for accessing a storage medium.

3. The control device according to claim 2, wherein the integrated circuit is separate from a drive circuit in which the drive current is generated.

4. The control device according to claim 3, wherein the analog control signal is transmitted to the drive circuit through a first analog signal line that is coupled between the integrated circuit and the drive circuit, and
the analog current amount signal is transmitted to the integrated circuit through a second analog signal line that is coupled between the integrated circuit and the drive circuit.

5. The control device according to claim 2, further comprising:
a drive current generating module configured to generate the drive current that is included in the integrated circuit.

6. The control device according to claim 1, wherein the A/D converting module, the control signal generating module, and the D/A converting module are integrated in one drive circuit, along with a drive current generating section, and
the drive circuit is separate from a control circuit having a target value generating module configured to generate a target value signal indicating a target value for the current amount based on a detection value of a position of a head for accessing a storage medium.

7. The control device according to claim 1, wherein the A/D converting module, the control signal generating module, and the DA converting module are included in an integrated drive circuit, along with a drive current generating section.

8. A disk apparatus comprising:
the control device according to claim 1.

9. A method comprising:
sampling an analog current amount signal indicating a current amount for a drive current of a motor that moves a head for accessing a storage medium, and converting the analog current amount signal into a digital current amount signal;
generating a digital control signal corresponding to a manipulation amount of the drive current, based on a difference between the current amount indicated by the digital current amount signal and a target value;
generating a control signal relating to the current amount with a prescribed period in a control circuit that is separate from the drive circuit based on a detection value for a position of the head sampled with the prescribed period;
generating a target value for the current amount with a period shorter than the prescribed period in the drive circuit, based on the control signal generated with the prescribed period by the control circuit; and
converting the digital control signal into an analog control signal and outputting the analog control signal to a drive current generating module that generates a drive current.

10. The method according to claim 9, further comprising:
generating a target value signal indicating the target value of the current amount based on a detection value for a position of the head, and
the generating a target value signal, converting the analog current amount signal into a digital current amount signal, the generating the digital control signal, and the converting the digital control signal into an analog control signal being performed by an integrated control circuit.

11. The method according to claim 10, further comprising:
generating a drive current in a drive current generating module of a drive circuit that is separate from the integrated control circuit.

12. The method according to claim 11, further comprising:
transmitting the analog control signal to the drive circuit through a first analog signal line that is coupled between the integrated control circuit and the drive circuit; and
transmitting the analog current amount signal to the integrated control circuit through a second analog signal line that is coupled between the integrated control circuit and the drive circuit.

13. The method according to claim 10, wherein generating a drive current is implemented in the integrated control circuit.

14. The method according to claim 9, further comprising:
generating a target value signal indicating a target value for the current amount based on a detection value of a position of the head, and
wherein the converting the analog current amount signal into a digital current amount signal, the generating the digital control signal, and the converting the digital control signal into an analog control signal are performed by a drive circuit that is provided separately from a control circuit that performs generating the target value signal.

15. The method according to claim 9,
wherein generating the digital control signal includes generating a digital control signal corresponding to a manipulation amount of the drive current based on a difference between the current amount indicated by the digital current amount signal and the target value for the current amount of the drive current generated with the period shorter than the prescribed period, and
wherein the converting the analog current amount signal into a digital current amount signal, the generating the digital control signal, and the converting the digital control signal into an analog control signal are performed by a drive circuit including a drive current generating section.

* * * * *